(12) United States Patent
Minemura et al.

(10) Patent No.: US 9,163,157 B2
(45) Date of Patent: Oct. 20, 2015

(54) ACRYLIC RESIN COMPOSITION AND MOLDINGS IN WHICH SAID COMPOSITION IS USED

(71) Applicants: MITSUBISHI GAS CHEMICAL COMPANY, INC., Tokyo (JP); MGC FILSHEET CO., LTD., Saitama (JP)

(72) Inventors: Masahiko Minemura, Gunma (JP); Noriyoshi Ogawa, Ibaraki (JP); Tatsuya Kanagawa, Osaka (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 20 days.

(21) Appl. No.: 13/888,694

(22) Filed: May 7, 2013

(65) Prior Publication Data

US 2013/0309502 A1 Nov. 21, 2013

Related U.S. Application Data

(62) Division of application No. 12/922,518, filed as application No. PCT/JP2009/053233 on Feb. 23, 2009, now abandoned.

(30) Foreign Application Priority Data

Mar. 17, 2008 (JP) .................................. 2008-068605

(51) Int. Cl.
| | |
|---|---|
| B32B 27/08 | (2006.01) |
| C09D 133/12 | (2006.01) |
| C08L 33/12 | (2006.01) |
| C09D 133/02 | (2006.01) |
| C08L 33/02 | (2006.01) |
| C08G 64/18 | (2006.01) |
| C08F 220/14 | (2006.01) |
| C08L 69/00 | (2006.01) |

(52) U.S. Cl.
CPC .............. *C09D 133/02* (2013.01); *B32B 27/08* (2013.01); *C08L 33/02* (2013.01); *C08L 33/12* (2013.01); *C09D 133/12* (2013.01); *C08F 220/14* (2013.01); *C08G 64/186* (2013.01); *C08L 69/00* (2013.01); *Y10T 428/31507* (2015.04)

(58) Field of Classification Search
None
See application file for complete search history.

(56) References Cited

U.S. PATENT DOCUMENTS

| | | | | |
|---|---|---|---|---|
| 4,096,315 | A * | 6/1978 | Kubacki | ........................ 428/412 |
| 4,478,981 | A | 10/1984 | Arkles | |
| 5,519,105 | A | 5/1996 | Boden et al. | |
| 5,616,674 | A | 4/1997 | Michel et al. | |
| 5,739,257 | A | 4/1998 | Boden et al. | |
| 5,804,525 | A | 9/1998 | Boden et al. | |
| 2003/0139504 | A1 | 7/2003 | Miebach et al. | |
| 2005/0101757 | A1 | 5/2005 | Glasgow et al. | |
| 2009/0263663 | A1 | 10/2009 | Ogawa et al. | |
| 2014/0242392 | A1* | 8/2014 | Ogawa et al. | ................. 428/412 |

FOREIGN PATENT DOCUMENTS

| | | |
|---|---|---|
| JP | 6-287430 | 10/1994 |
| JP | 7-258398 | 10/1995 |
| JP | 07258398 | * 10/1995 |
| JP | 8-041192 | 2/1996 |
| JP | 9-176252 | 7/1997 |
| JP | 2008-299119 | 12/2008 |
| WO | 2006/134045 | 12/2006 |
| WO | WO-2006/134045 | * 12/2006 |

OTHER PUBLICATIONS

International Search Report issued Jun. 2, 2009 in International (PCT) Application No. PCT/JP2009/053233.
Machine translation of JP 07-258398 (no date).

* cited by examiner

*Primary Examiner* — David Buttner
(74) *Attorney, Agent, or Firm* — Wenderoth, Lind & Ponack, L.L.P.

(57) ABSTRACT

The present invention relates to a multilayer laminated product which at least contains a layer formed of an acrylic resin composition containing an acrylic resin as a main component, and a specific terminally-modified polycarbonate resin. Moreover, the multilayer laminated product of the present invention has an excellent releasability and low frictional properties.

8 Claims, No Drawings

ACRYLIC RESIN COMPOSITION AND MOLDINGS IN WHICH SAID COMPOSITION IS USED

TECHNICAL FIELD

The present invention relates to an acrylic resin composition comprising a specific terminal silicone-modified polycarbonate resin. Moreover, it relates to moldings such as a film, a sheet and a multilayer sheet with other resins having an excellent releasability and low frictional properties in which said acrylic resin composition is used, and to a process for producing the same.

BACKGROUND ART

Acrylic resins are applied in various fields such as an optical lens, a protection material for a liquid crystal panel and an aquarium because of their excellent transparency and scratch resistance. Above all, they are often used for a hard coating on the other resins since the surface is hard and has excellent scratch resistance. Especially, a polymer laminated body such as a multilayer sheet in combination with polycarbonate which also has excellent transparency and high impact resistance is quite suitable for a field such as various kinds of windowpanes, a transparent roof and a transparent panel member wherein scratch resistance and impact resistance are required, and the demand is high.

Examples of way for laminating an acrylic resin with a polycarbonate resin include known methods such as (1) a method of co-extruding a polycarbonate resin and an acrylic resin to mold a multilayer sheet and (2) a method of coating a monomer of the acrylic resin on a polycarbonate resin sheet substrate and then curing by light or heat. Of the two methods, the method (1) has been commonly used in these days for the reason that the method (2) has problems such as work environment pollution by volatilization of acrylic monomers and complicated management of coating and/or curing equipments. However, the method (1) also has problems that releasability of the acrylic resin from the sheet molding roll at the time of co-extrusion is poor, which would occasionally cause deterioration in moldability and appearance.

In order to solve the above problems, methods of using an acrylic resin composition comprising various types of lubricants are disclosed (Patent Document 1, Patent Document 2). According to these methods wherein lubricants such as fatty acid ester and fatty acid amide are used, though roll releasing properties may be improved, accumulation of lubricants on the roll and whitening under the circumstances of high temperature and high humidity may occur in some cases, and there is room for improvement.

Meanwhile, it is known to use a modified polycarbonate resin having a silicone structure in its main chain (Patent Document 3). Since this modified polycarbonate is a polymer having a high molecular weight, problems caused by volatilization can be solved. However, releasability thereof is not necessarily satisfactory and there is room for improvement.

In addition, thought a modified polycarbonate having a silicone structure in its molecular terminal itself is known (Patent Document 4), there is no case of applying it to an acrylic resin having different refraction index and compatibility, and there is no knowledge about transparency, slidability and environmental stability.

Patent Document 1: Jpn. Pat. Laid-Open Publication No. 2005-225018
Patent Document 2: Jpn. Pat. Laid-Open Publication No. 2006-205478
Patent Document 3: Jpn. Pat. Laid-Open Publication No. H05-200827
Patent Document 4: Jpn. Pat. Laid-Open Publication No. H07-258398

DISCLOSURE OF THE INVENTION

Problems to be Solved by the Invention

The problem to be solved by the present invention is to solve the above-mentioned defects of the prior art, and to provide an acrylic resin composition which is highly improved in releasability from a molding roll at the time of manufacturing an acrylic resin sheet, especially to provide an acrylic resin/polycarbonate resin multilayer sheet wherein releasability of an acrylic resin from a molding roll at the time of manufacturing a multilayer sheet of a polycarbonate resin and an acrylic resin is improved as well as accumulation of lubricants onto the roll is reduced (low roll accumulation), and excellent appearance can be maintained even under the circumstances of high temperature and high humidity (excellence in environmental stability), and to provide an acrylic resin composition which can form this kind of multilayer sheets.

Means for Solving the Problems

The inventors of the present invention searched a new lubricant to be blended with an acrylic resin, especially a lubricant suitable for an acrylic resin composition for laminating with a polycarbonate resin and paid intensive research efforts to dissolve the above-mentioned problems, and as a result, they found that a specific terminal silicone-modified polycarbonate resin was a lubricant having excellent releasability, stability under high temperature and high humidity and low roll accumulation, and thus completed the present invention.

Thus, the present invention relates to an acrylic resin composition and a process for producing the same, and in addition, a molded product and a multilayer laminated product thereof, and a process for producing the same shown below.
1) An acrylic resin composition which comprises an acrylic resin as a main component and a terminally-modified polycarbonate resin having terminal groups represented by the following general formula (1):

[Chemical Formula 1]

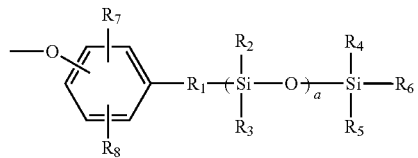

(1)

(In the formula (1), $R_1$ represents an alkylene group having 1 to 20 carbon atoms and $R_2$ to $R_6$ represent hydrogen, an alkyl group having 1 to 10 carbon atoms, an aryl group having 6 to 12 carbon atoms or an alkenyl group having 2 to 10 carbon atoms. $R_7$ and $R_8$ represent hydrogen, fluorine, chlorine, bromine, iodine, an alkyl group having 1 to 10 carbon atoms, an aryl group having 6 to 12 carbon atoms, an alkenyl group having 2 to 10 carbon atoms, an alkoxy group having 1 to 5 carbon atoms or an aralkyl group having 7 to 17 carbon atoms. "a" is an integer from 1 to 1000.)

2) The acrylic resin composition according to 1), wherein the content of said terminally-modified carbonate resin is 0.1 to 10% by weight.
3) The acrylic resin composition according to 1) or 2), wherein said terminally-modified carbonate resin has the intrinsic viscosity of 0.05 to 1.5 dl/g.
4) The acrylic resin composition according to any one of 1) to 3), wherein $R_2$ to $R_6$ in said general formula (1) is hydrogen, a methyl group, a butyl group or a phenyl group.
5) The acrylic resin composition according to any one of 1) to 4), wherein $R_1$ in said general formula (1) is an alkylene group having 1 to 6 carbon atoms.
6) The acrylic resin composition according to any one of 1) to 5), wherein "a" in said general formula (1) is from 4 to 100.
7) The acrylic resin composition according to any one of 1) to 6), wherein said terminally-modified polycarbonate resin has repeating units represented by the following general formula (2):

[Chemical Formula 2]

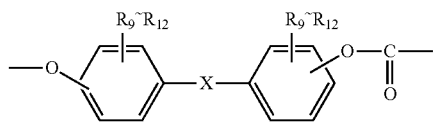

(2)

(In the formula (2), $R_9$ to $R_{12}$ represent hydrogen, fluorine, chlorine, bromine, iodine, an alkyl group having 1 to 9 carbon atoms, an aryl group having 6 to 12 carbon atoms, an alkenyl group having 2 to 5 carbon atoms, an alkoxy group having 1 to 5 carbon atoms or an aralkyl group having 7 to 17 carbon atoms. "X" represents a group selected from the group consisting of divalent organic groups represented by the following formulas:

[Chemical Formula 3]

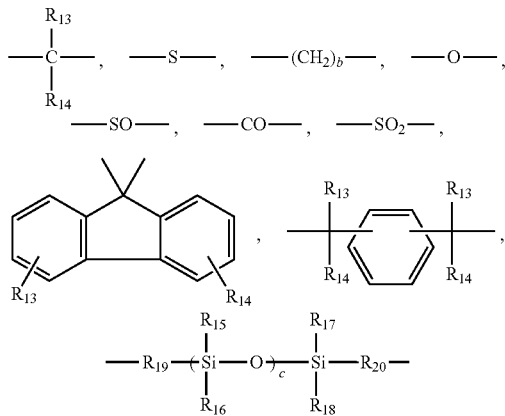

(In the above formulas, $R_{13}$ and $R_{14}$ represent hydrogen, fluorine, chlorine, bromine, iodine, an alkyl group having 1 to 9 carbon atoms, an alkoxy group having 1 to 5 carbon atoms or an aryl group having 6 to 12 carbon atoms, or a group forming a carbon ring or a heterocycle wherein $R_{13}$ and $R_{14}$ are bonded with each other. $R_{15}$ to $R_{18}$ represent hydrogen, an alkyl group having 1 to 10 carbon atoms, an aryl group having 6 to 12 carbon atoms or an alkenyl group having 2 to 10 carbon atoms. $R_{19}$ and $R_{20}$ represent an alkylene group having 1 to 20 carbon atoms. "b" is an integer from 0 to 20. "c" is an integer from 1 to 1000.)

8) The acrylic resin composition according to 7), wherein said repeating units represented by the general formula (2) are derived from 2,2-bis(4-hydroxyphenyl) propane, 1,1-bis(4-hydroxyphenyl)cyclohexane, 2,2-bis(4-hydroxy-3-methylphenyl) propane, bis(4-hydroxyphenyl)methane, 4,4'-biphenyldiol or α,ω-bis[3-(o-hydroxyphenyl) propyl]polydimethylsiloxane.
9) The acrylic resin composition according to 7) or 8), wherein the average degree of polymerization of said repeating units represented by the general formula (2) is 7 to 200.
10) The acrylic resin composition according to any one of 1) to 9), wherein said acrylic resin is derived from monomers comprising an acrylic monomer selected from the group consisting of acrylic acids, acrylates and methacrylates as a main component.
11) The acrylic resin composition according to 10), wherein said acrylic resin is polymethylmethacrylate copolymer.
12) The acrylic resin composition according to any one of 1) to 11), which further comprises fatty acid amides and/or higher alcohols.
13) A molded product obtained by molding the acrylic resin composition according to any one of 1) to 12).
14) The molded product according to 13), which is a film or sheet molded product.
15) A multilayer laminated product which at least comprises a layer formed of the acrylic resin composition according to 1) to 12) and a layer formed of other resins.
16) The multilayer laminated product according to 15), which is a polycarbonate resin laminated product wherein a polycarbonate resin is used as said other resins and said layer formed of the acrylic resin composition is laminated on one side or both sides of the layer formed of the polycarbonate resin.
17) The multilayer laminated product according to 15) or 16), which further comprises a hardcoat layer.
18) A process for producing the acrylic resin composition according to any one of 1) to 12), which comprises a process of mixing acrylic monomers with a terminally-modified polycarbonate resin having terminal groups represented by the following general formula (1) and subsequently polymerizing said acrylic monomers by heat or light.

[Chemical Formula 4]

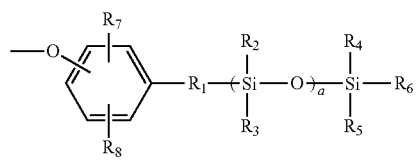

(1)

(In the formula (1), $R_1$ represents an alkylene group having 1 to 20 carbon atoms and $R_2$ to $R_6$ represent hydrogen, an alkyl group having 1 to 10 carbon atoms, an aryl group having 6 to 12 carbon atoms or an alkenyl group having 2 to 10 carbon atoms. $R_7$ and $R_8$ represent hydrogen, fluorine, chlorine, bromine, iodine, an alkyl group having 1 to 10 carbon atoms, an aryl group having 6 to 12 carbon atoms, an alkenyl group having 2 to 10 carbon atoms, an alkoxy group having 1 to 5 carbon atoms or an aralkyl group having 7 to 17 carbon atoms. "a" is an integer from 1 to 1000.)
19) A process for producing a multilayer laminated product comprising a layer formed of the acrylic resin composition according to any one of 1) to 12) and a layer formed of other resins, which comprises a step of molding by co-extrusion of a resin forming said layer formed of other resins with said acrylic resin composition.

20) A process for producing a multilayer laminated product comprising a layer formed of the acrylic resin composition according to any one of 1) to 12) and a layer formed of other resins, which comprises a step of coating a mixture of acrylic monomers and a terminally-modified polycarbonate resin having terminal groups represented by the following general formula (1) on said layer formed of other resins and subsequently polymerizing acrylic monomers in said mixture by heat or light.

[Chemical Formula 5]

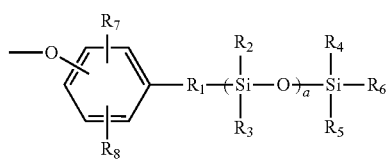

(1)

(In the formula (1), $R_1$ represents an alkylene group having 1 to 20 carbon atoms and $R_2$ to $R_6$ represent hydrogen, an alkyl group having 1 to 10 carbon atoms, an aryl group having 6 to 12 carbon atoms or an alkenyl group having 2 to 10 carbon atoms. $R_7$ and $R_8$ represent hydrogen, fluorine, chlorine, bromine, iodine, an alkyl group having 1 to 10 carbon atoms, an aryl group having 6 to 12 carbon atoms, an alkenyl group having 2 to 10 carbon atoms, an alkoxy group having 1 to 5 carbon atoms or an aralkyl group having 7 to 17 carbon atoms. "a" is an integer from 1 to 1000.)

Effects of the Invention

The terminally-modified polycarbonate resin comprised in the acrylic resin composition of the present invention has lower volatility since it has a higher molecular weight than conventional lubricants for an acrylic resin. In addition, since it has polysiloxane groups at the terminal, the degree of freedom of polysiloxane groups is higher than a modified polycarbonate having a silicone structure in its main chain and slidability on the surface of the resin is unexpectedly excellent, and an excellent lubricating effect can be obtained in small amounts.

Therefore, the acrylic resin composition comprising the terminally-modified polycarbonate resin like this can exhibit excellent roll releasability without accompanying pollution (accumulation of lubricants on a roll) or deterioration of slidability caused by volatilization and/or a large-volume use of lubricants. Moreover, a molded product formed of said acrylic resin composition would not easily whitened even under the circumstances of high temperature and high humidity, and can maintain an excellent slidability.

Especially, in case of molding a multilayer laminated product by co-extrusion with a polycarbonate resin, improvement of the roll releasability of the acrylic resin layer as well as an extreme reduction of the roll-adhered substances can be obtained. Therefore, the polycarbonate resin laminated product using the acrylic resin composition of the present invention does not cause whitening under the circumstances of high temperature and high humidity, and can maintain an excellent appearance. Thus, it is suitable for a field wherein scratch resistance and impact resistance are required such as various kinds of windowpane materials, optical members, protecting sheets for LCD and EL displays and the like.

BEST MODE FOR CARRYING OUT THE INVENTION

The acrylic resin composition of the present invention comprises an acrylic resin as a main component and a terminally-modified polycarbonate resin in addition thereto.

(1) Acrylic Resin

The acrylic resin, which is a main component of the resin composition of the present invention, is not particularly limited as far as it is a resin derived from mainly acrylic monomers. Examples of the acrylic monomers include (meth)acrylic acids, (meth)acrylates and (meth)acrylamides.

Examples of the (meth)acrylic acids include methacrylic acid and acrylic acid. Examples of (meth)acrylates include alkyl methacrylates having 1 to 20 carbon atoms such as methyl methacrylate, ethyl methacrylate, propyl methacrylate, butyl methacrylate, cyclohexyl methacrylate, octyl methacrylate, lauryl methacrylate and stearyl methacrylate; alkyl acrylates having 1 to 20 carbon atoms such as methyl acrylate, ethyl acrylate, propyl acrylate, butyl acrylate, octyl acrylate, lauryl acrylate and stearyl acrylate; and glycidyl (meth)acrylates such as glycidyl methacrylate and glycidyl acrylate. Examples of (meth)acrylamides include methacrylamide and acrylamide.

These acrylic monomers can be used each independently or two or more can be used in combination with each other. Among them, methyl methacrylate is most preferable.

The acrylic resin derived from the above-mentioned acrylic monomers can be a homopolymer derived from only one kind of the above-mentioned acrylic monomers, or can be a copolymer derived from two or more of the acrylic monomers in combination with each other, or can be a copolymer of the acrylic monomers as a main monomer in combination with less than 50% by weight of other vinyl monomers. Examples of the other vinyl monomers include styrene, α-methyl styrene, acrylonitrile, butadiene and vinyl acetate.

Preferable examples of the acrylic resin to be used for the present invention include polymethylmethacrylate and a copolymer derived from methylmethacrylate as a main monomer. Most preferable examples thereof include methylmethacrylate copolymer derived from methylmethacrylate as a main monomer in combination with methacrylate as a comonomer.

A process for producing an acrylic resin, in general, can be classified into emulsion polymerization, suspension polymerization and continuous polymerization. Any resins produced by any processes of polymerization can be used as the acrylic resin to be used for the present invention. It is preferable to use an acrylic resin produced by suspension polymerization or continuous polymerization, and it is more preferable to use an acrylic resin produced by continuous polymerization. Continuous polymerization can be classified into continuous mass polymerization and continuous solution polymerization. According to the present invention, acrylic resins obtained by either polymerization process can be used.

According to continuous mass polymerization and continuous solution polymerization, additives such as an emulsifier as polymerization auxiliaries or a suspension dispersing agent are never used. A polymerization initiator for initiating polymerization and a chain transfer agent for adjusting a molecular weight are simply added thereto. According to continuous solution polymerization, examples of solvents include toluene, ethylbenzene, xylene, hexane, octane, cyclohexane, methanol, ethanol, propanol, butanol, acetone and methylethylketone. However, it is not particularly limited to them as far as polymerization is carried out efficiently and no residual solvent remains in the acrylic resin obtained.

As a polymerization initiator, common azo polymerization initiators or peroxide polymerization initiators can be selected. Examples of azo polymerization initiators include 2,2'-azobisisobutyronitrile, 2,2'-azobis(2-methyl-butyronitrile) and 1,1'-azobis(cyclohexane-1-carbonitrile). Examples of peroxide polymerization initiators include benzoyl peroxide, di-t-butylperoxide and di-t-amylperoxide. However, it is not particularly limited to them. As a chain transfer agent, it is common to use mercaptans. Examples of the mercaptans include butyl mercaptan, hexyl mercaptan, octyl mercaptan and dodecyl mercaptan. However, it is not particularly limited to them (2) Terminally-Modified Polycarbonate Resin The terminally modified polycarbonate resin to be used for the present invention is polycarbonate having a terminal polysiloxane structure represented by the following general formula (1):

[Chemical Formula 6]

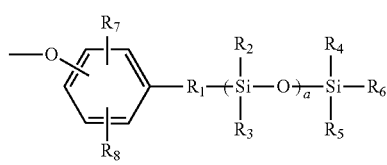

(1)

In the above formula (1), $R_1$ represents an alkylene group having 1 to 20 carbon atoms, preferably having 1 to 6 carbon atoms. Examples of the alkylene group include an ethylene group, a propylene group and a methyl ethylene group.

$R_2$ to $R_6$ represent a hydrogen atom, an alkyl group having 1 to 10 carbon atoms, an aryl group having 6 to 12 carbon atoms or an alkenyl group having 2 to 10 carbon atoms. They can be same or different with each other. Examples of the alkyl group having 1 to 10 carbon atoms include a methyl group, an ethyl group, a n-propyl group, a n-butyl group and a cycloalkyl group such as a cyclohexyl group. Examples of the aryl group having 6 to 12 carbon atoms include a phenyl group and a tolyl group. Examples of the alkenyl group having 2 to 10 carbon atoms include a vinyl group, an allyl group, a hexenyl group and an octenyl group. Among them, a hydrogen atom, a methyl group, an ethyl group, a butyl group and a phenyl group are preferable.

$R_7$ and $R_8$ represent a group selected from the group consisting of hydrogen, fluorine, chlorine, bromine, iodine, an alkyl group having 1 to 10 carbon atoms (preferably having 1 to 4 carbon atoms), an aryl group having 6 to 12 carbon atoms, an alkenyl group having 2 to 10 carbon atoms, an alkoxy group having 1 to 5 carbon atoms or an aralkyl group having 7 to 17 carbon atoms (preferably having 7 carbon atom). These $R_7$ and $R_8$ can be same or different with each other. Particularly preferable examples of $R_7$ and $R_8$ include an alkyl group having 1 to 9 carbon atoms and an aryl group having 6 to 12 carbon atoms. More precisely, examples thereof include a methyl group, an ethyl group, a propyl group, a n-butyl group, a sec-butyl group, a tert-butyl group, a phenyl group and a methoxy group. Among them, a methyl group, a butyl group and a phenyl group are most preferable.

Examples of polysiloxane groups comprised in the above-mentioned general formula (1) include a group derived from polydimethylsiloxane, polydiphenylsiloxane, polymethylphenylsiloxane, polyvinylmethylsiloxane and polymethyl hydrogen siloxane. Two or more of them can be comprised in combination with each other.

The length of the polysiloxane group is represented by a polymerization degree "a" in the general formula (1). "a" is 1 to 1000, preferably 4 to 100, more preferably 6 to 50. In order to obtain sufficient characteristics of slidability by siloxane, it is better that "a" is large to a certain degree. However, the polymer with "a" which is larger than 1000 is not so practical since a productive efficiency of the terminally-modified polycarbonate resin may be declined as mentioned below. In addition, the polymerization degree "a" only means an average degree of polymerization, and in general, the degree of polymerization itself has a distribution.

The polycarbonate resin forming the terminally-modified polycarbonate resin having the terminal groups represented by the above-mentioned general formula (1) of the present invention is not particularly limited as far as it is a common polycarbonate resin. Preferably, it is polycarbonate having the repeating unit represented by the following general formula (2) (a carbonate unit).

[Chemical Formula 7]

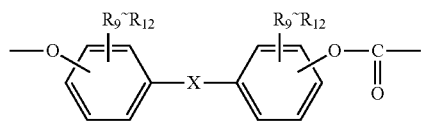

(2)

In the above formula (2), $R_9$ to $R_{12}$ represent hydrogen, fluorine, chlorine, bromine, iodine, an alkyl group having 1 to 9 carbon atoms, an aryl group having 6 to 12 carbon atoms, an alkenyl group having 2 to 5 carbon atoms, an alkoxy group having 1 to 5 carbon atoms or an aralkyl group having 7 to 17 carbon atoms. The most preferable examples of $R_9$ to $R_{12}$ include hydrogen and a methyl group.

"X" represents a group selected from the group consisting of divalent organic groups represented by the following formulas:

[Chemical Formula 8]

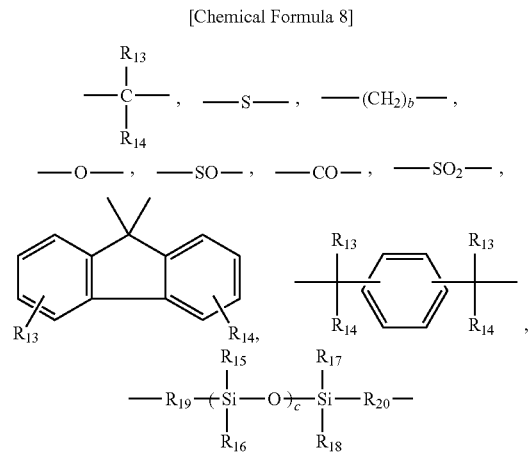

In the above formulas, $R_{13}$ and $R_{14}$ represent hydrogen, fluorine, chlorine, bromine, iodine, an alkyl group having 1 to 9 carbon atoms, an alkoxy group having 1 to 5 carbon atoms or an aryl group having 6 to 12 carbon atoms, or a group forming a carbon ring or a heterocycle wherein $R_{13}$ and $R_{14}$ are bonded with each other.

$R_{15}$ to $R_{18}$ represent a hydrogen atom, an alkyl group having 1 to 10 carbon atoms, an aryl group having 6 to 12 carbon atoms or an alkenyl group having 2 to 10 carbon atoms carbon atoms. They can be same or different with each other. Examples of the alkyl group having 1 to 10 carbon atoms include a methyl group, an ethyl group, a propyl group, a butyl group and a cycloalkyl group such as a cyclohexyl group. Examples of the aryl group having 6 to 12 carbon atoms include a phenyl group and a tolyl group. Examples of the alkenyl group having 2 to 10 carbon atoms include a vinyl group, an allyl group, a hexenyl group and an octenyl group. Among them, a hydrogen atom, a methyl group, a vinyl group and a phenyl group are preferable.

$R_{19}$ and $R_{20}$ represent an alkylene group having 1 to 20 carbon atoms, preferably having 2 to 8 carbon atoms. Examples thereof include an ethylene group, a n-propylene group and a n-butylene group. "b" is an integer from 0 to 20. "c" is an integer from 1 to 1000, preferably from 4 to 100, more preferably from 6 to 50.

Examples of the most preferable repeating unit represented by the above general formula (2) include a structural unit derived from 2,2-bis(4-hydroxyphenyl) propane, 1,1-bis(4-hydroxyphenyl)cyclohexane, 2,2-bis(4-hydroxy-3-methylphenyl) propane, bis(4-hydroxyphenyl)methane, 4,4'-biphenyldiol or α,ω-bis[3-(o-hydroxyphenyl) propyl]polydimethylsiloxane.

Examples of the preferable terminally-modified polycarbonate resin to be used for the present invention include a polycarbonate resin consisting of the repeating unit represented by the above general formula (2) having the terminal structure represented by the above general formula (1), more precisely, a polycarbonate resin having the structure represented by the following general formula (2'). In the following formula (2'), $R_9$ to $R_{12}$, "X" and "n" represent the same meanings as in the above general formula (2). "(A)" represents a terminal group represented by the above general formula (1).

[Chemical Formula 9]

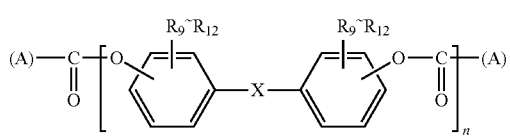
(2')

In the above formula (2'), "n", which is an average degree of polymerization, represents an integer of not less than 1, preferably a number of 7 to 200 on average, more preferably a number in the range of 20 to 100 on average.

The average molecular weight of the terminally-modified polycarbonate resin is not particularly limited. It is preferable that the intrinsic viscosity [η] thereof is in the range from 0.05 to 1.5 [dl/g]. When the intrinsic viscosity is in this range, it is easy to add and mix with an acrylic resin and is easy in handling. Conversion of the intrinsic viscosity into a viscosity average molecular weight (Mv) can be carried out by using [intrinsic viscosity [η]=$1.23 \times 10^{-4}$ Mv$^{0.83}$].

In addition, in consideration of roll staining after a long-term continuous molding, a temperature of 1% weight loss on heating of the terminally-modified polycarbonate resin preferably between 230 and 490° C., more preferably between 280 and 490° C. When the temperature of 1% weight loss on heating of the terminally-modified polycarbonate resin is lower than 230° C., the amount of volatilization at the time of molding may increase and the effect of roll releasability may be unstable.

The process for producing the terminally-modified polycarbonate resin to be used for the present invention is not particularly limited. For example, it is possible to produce by the process disclosed in Japanese Patent Laid-Open Publication No. H07-258398. More precisely, it can be produced by reacting bisphenols represented by the following general formula (3) and a monovalent phenol containing a polysiloxane group represented by the following general formula (4) with a carbonate-forming compound. In the following formula (3), $R_9$ to $R_{12}$ and "X" represent the same meanings as $R_9$ to $R_{12}$ and "X" in the general formula (2) respectively. Moreover, $R_1$ to $R_8$ and "a" in the following general formula (4) represent the same meanings as $R_1$ to $R_8$ and "a" in the general formula (1) respectively.

[Chemical Formula 10]

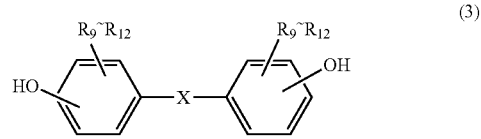
(3)

[Chemical Formula 11]

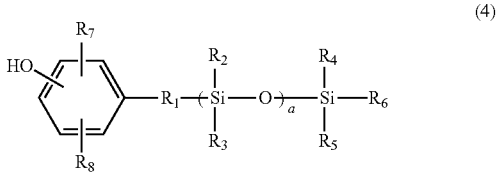
(4)

The monovalent phenol containing a polysiloxane group represented by the above general formula (4) can be produced by, for example, addition reaction of monovalent phenol having an unsaturated group (hereinafter, "unsaturated group-containing monovalent phenol") with polysiloxane having a Si—H group at one end (hereinafter, "hydrogen polysiloxane") under platinum catalyst.

Examples of the hydrogen polysiloxane to be used for producing the monovalent phenol containing a polysiloxane group include polydimethylsiloxane, polydiphenylsiloxane, polymethylphenylsiloxane, polyvinylmethylsiloxane and polymethyl hydrogen siloxane, which have a Si—H group at the one end. Two or more of them can be used in combination with each other.

The molecular weight of hydrogen polysiloxane is represented by the polymerization degree "a" in the general formula (4). "a" is 1 to 1000, preferably 4 to 100, more preferably 6 to 50. In order to obtain sufficient characteristics of slidability by siloxane, it is better that "a" is large to a certain degree. However, the polymer with "a" which is larger than 1000 is not so practical because reactivity with the unsaturated group-containing monovalent phenol may be deteriorated. In addition, since the hydrogen polysiloxane is a polymer which is a mixture of various short-chain polymers and long-chain polymers, the polymerization degree "a" only means an average degree of polymerization, and in general, the degree of polymerization itself has a distribution.

Examples of the unsaturated group-containing monovalent phenol to be reacted with hydrogen polysiloxane include p-hydroxystyrene, p-isopropenylphenol, o-allylphenol, p-allylphenol, eugenol, isoeugenol, 2,6-dimethyl-4-allylphenol, 4-(1-butenyl)phenol, 4-(1-pentanyl)phenol, 4-(1-hexanyl)phenol, 4-(1-octanyl)phenol, 4-(1-decanyl)phenol, 4-(1-dodecanyl)phenol, 4-(1-tetradecanyl)phenol, 4-(1-hexadecanyl)phenol and 4-(1-nonadecanyl)phenol. Two or more of the compounds can be used in combination with each other. Among them, the most preferable compound is o-allylphenol.

Catalysts to be used for hydrosilylation (reaction of hydrogen polysiloxane with unsaturated group-containing monovalent phenol) can be either homogeneous or heterogeneous.

Examples of the catalysts include a platinum complex such as chloroplatinic acid, metal platinum, octacarbonyl 2-cobalt, a palladium complex and a rhodium complex.

The reaction is carried out in the solution in which unsaturated group-containing monovalent phenol to be used for the present invention is dissolved. Examples of the solvents include halogenated hydrocarbons such as carbon tetrachloride, chloroform and 1,2-dichloroethane, aromatic hydrocarbons such as benzene, toluene and xylene, aromatic halides such as monochlorobenzene and dichlorobenzene, methylethylketone, ethyl acetate, 1,4-dioxane, cyclohexane and pyridine. In view of solubility and affinity with catalyst, it is preferable to use aromatic hydrocarbons such as benzene, toluene and xylene. In addition, the reaction temperature is preferably not lower than 60° C.

Examples of the monovalent phenol containing a polysiloxane group represented by the above general formula (4) include compounds having the following structures. In the following structural formulae, a is an integer from 1 to 1000 and (a+d)≤1000.

[Chemical Formula 12]

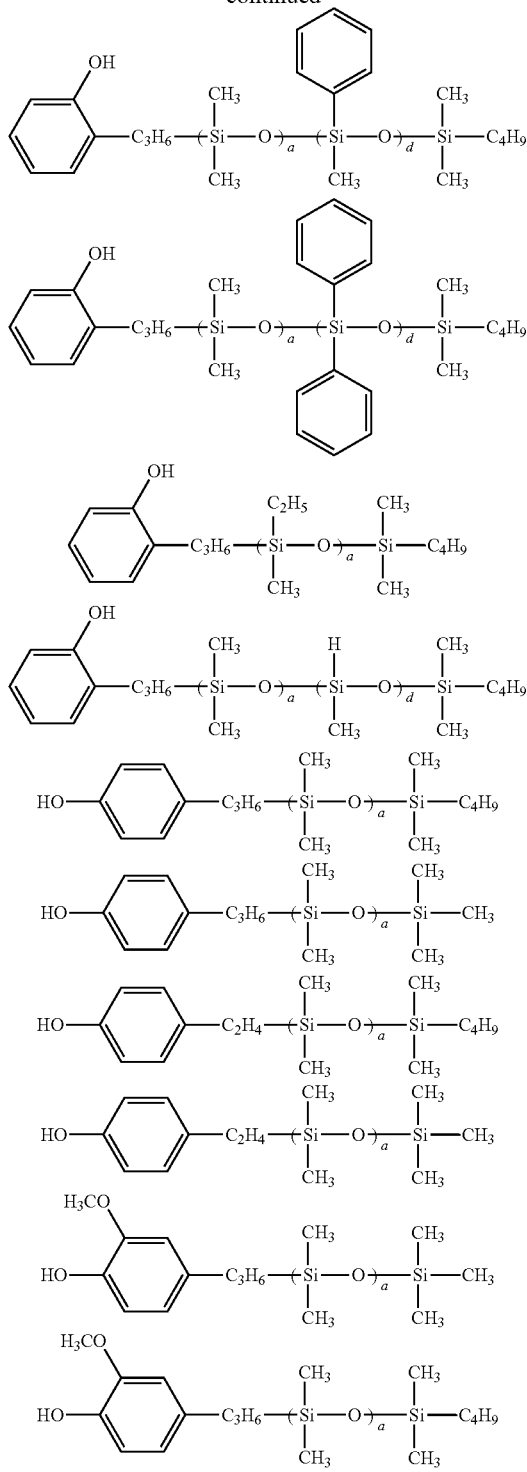

Two or more of the above-shown monovalent phenol containing a polysiloxane group can be used in combination with each other. Furthermore, in addition to the monovalent phenol containing a polysiloxane group represented by the above general formula (4), it is possible to use terminal terminating agents such as phenol, alkyl-substituted phenols such as p-t-butylphenol and alkylester substituted phenols such as p-hydroxyphenyl butylbenzoate in combination. However, it is preferable to restrict the amount used so as to be less than 50% by weight ratio based upon the monovalent phenol containing a polysiloxane group represented by the above general formula (4).

Examples of the bisphenols represented by the above general formula (3) include 4,4'-biphenyldiol,
bis(4-hydroxyphenyl)methane, bis(4-hydroxyphenyl)ether,
bis(4-hydroxyphenyl)sulfone,
bis(4-hydroxy-3-methylphenyl)sulfone,
bis(4-hydroxyphenyl)sulfoxide, bis(4-hydroxyphenyl)sulfide,
bis(4-hydroxyphenyl)ketone, 1,1-bis(4-hydroxyphenyl)ethane,
2,2-bis(4-hydroxyphenyl)propane (bisphenol A; BPA),
2,2-bis(4-hydroxy-3-t-butylphenyl)propane,
2,2-bis(4-hydroxyphenyl)butane,
1,1-bis(4-hydroxyphenyl)cyclohexane,
2,2-bis(4-hydroxy-3-methylphenyl)propane,
2,2-bis(4-hydroxy-3,5-dimethylphenyl)propane,
1,1-bis(4-hydroxyphenyl)-1-phenylethane,
bis(4-hydroxyphenyl)diphenylmethane,
2,2-bis(4-hydroxy-3-allylphenyl)propane,
3,3,5-trimethyl-1,1-bis(4-hydroyphenyl)cyclohexane,
1,1-bis(4-hydroxy-2-methyl-5-t-butylphenyl)-2-methylpropane,
9,9-bis(4-hydroxy-3-ethylphenyl)fluorene,
9,9-bis(4-hydroxy-3-methylphenyl)fluorene,
9,9-bis(4-hydroxyphenyl)fluorene,
1,1-bis(4-hydroxyphenyl)cyclododecane,
1,1-bis(4-hydroxy-3-methylphenyl)cyclododecane,
2,2-bis(4-hydroxyphenyl)hexafluoropropane,
2,2-bis(4-hydroxy-3,5-dibromophenyl)propane,
α,ω-bis[3-(o-hydroxyphenyl)propyl]polydimethyldiphenyl- random copolymeric siloxane,
α,ω-bis[3-(o-hydroxyphenyl)propyl]polydimethylsiloxane,
4,4'-[1,4-phenylene-bis(1-methylethylidene)]bisphenol, and
4,4'-[1,3-phenylene-bis(1-methylethylidene)]bisphenol.

Two or more of them can be used in combination with each other.

Particularly, it is preferable to select
2,2-bis(4-hydroxyphenyl)propane,
1,1-bis(4-hydroxyphenyl)cyclohexane,
2,2-bis(4-hydroxy-3-methylphenyl)propane,
bis(4-hydroxyphenyl)methane, 4,4'-biphenyldiol or
α,ω-bis[3-(o-hydroxyphenyl)propyl]polydimethylsiloxane
among them.

Examples of the carbonate-forming compounds include phosgenes and bisarylcarbonates such as diphenylcarbonate, di-p-tolylcarbonate, phenyl-p-tolylcarbonate, di-p-chlorophenylcarbonate, dinaphthylcarbonate and the like.

Regarding the process for producing the terminally-modified polycarbonate resin to be used for the present invention, it can be produced by reacting bisphenols and monovalent phenol containing a polysiloxane group with a carbonate-forming compound by employing publicly known methods used for producing polycarbonate from bisphenol A such as a direct reaction process of bisphenols and phosgene (a phosgene method) and an ester exchange reaction (a transesterification method) of bisphenols with bisarylcarbonates.

Of the phosgene method and the transesterification method, it is preferable to employ the phosgene method in view of heat resistance of monovalent phenol containing a polysiloxane group represented by the general formula (4) and transesterification rate. In the phosgene method, it is preferable to use the monovalent phenol containing a polysiloxane group at the rate of not more than 80% by weight based upon the total of all bisphenols used, in view of reactivity of said monovalent phenol containing a polysiloxane group.

In the phosgene method, in general, the bisphenols represented by the general formula (3) and the monovalent phenol containing a polysiloxane group represented by the general formula (4) are reacted with phosgene under the presence of acid-binding agents and solvents. Examples of the acid-binding agents include pyridine and alkali metal hydroxides such as sodium hydroxide and potassium hydroxide. Examples of the solvents include methylene chloride, chloroform, chlorobenzene and xylene.

In addition, in order to accelerate the condensation polymerization reaction, catalysts such as tertiary amines such as triethylamine and quaternary ammonium salts can be used. For adjusting the polymerization degree, the above-mentioned monovalent phenol containing a polysiloxane group functions as a molecular weight adjuster. If necessary, anti-oxidants such as sodium sulfite and hydrosulfite and branching agents such as phloroglucin and isatin bisphenol can be added in small amounts.

Generally, it is proper to conduct the reaction in a temperature range between 0 and 150° C., preferably between 5 and 40° C. While the reaction time may vary depending on the reaction temperature, it is normally between 0.5 minutes and 20 hours, preferably between 1 minute and 2 hours. It is desirable to keep pH of the reaction system not below 10 during the reaction.

In the transesterification method, in general, the bisphenols represented by the general formula (3) and the monovalent phenol containing a polysiloxane group represented by the general formula (4) are mixed with bisarylcarbonate and are reacted at high temperature under reduced pressure.

The reaction is generally carried out at a temperature range between 150 and 350° C., preferably between 200 and 300° C. The ultimate pressure is preferably reduced to 1 mmHg or less to remove the phenols, which are derived from said bisarylcarbonate and are produced as a result of the transesterification reaction, from the reaction system by distillation.

While the reaction time varies depending on the reaction temperature and the reduced pressure level, it is generally 1 to 12 hours. The reaction is preferably carried out in an atmosphere of inert gas such as nitrogen or argon. If desired, the reaction can be carried out by adding antioxidants and/or branching agents.

The terminally-modified polycarbonate resin synthesized by the above-mentioned reactions can readily be added and mixed with an acrylic resin. It is preferable that the polycarbonate resin has an intrinsic viscosity [η] in the range from 0.05 to 1.5 [dl/g] as an easily handling range. Conversion of the intrinsic viscosity into a viscosity average molecular weight (Mv) can be carried out by using [intrinsic viscosity $[\eta]=1.23\times10^{-4} Mv^{0.83}$]. In consideration of roll staining after a prolonged continuous molding, a temperature of 1% weight loss on heating of the terminally-modified polycarbonate resin is preferably between 230 and 490° C., more preferably between 280 and 490° C. When the temperature of 1% weight loss on heating of the terminally-modified polycarbonate resin is lower than 230° C., volatilization volume at the time of molding may increase and the effect of roll releasability may be unstable.

In addition, at the time of synthesizing the terminally-modified polycarbonate resin of the present invention, all (100%) of the polycarbonate terminals are not necessarily converted into the terminal group represented by the general formula (1). In view of the residual amount of impurities and the rate of reaction, it can be thought that not less than 80% of the polycarbonate terminals are at least present as the terminal group represented by the general formula (1), and furthermore the carbonate resin having at least one siloxane at the terminal can be obtained at a rate of not less than 90%. Examples of the terminal having a structure other than the terminal group represented by the general formula (1) include an unreacted phenol terminal and a chloroformate terminal. Additionally, there may be one forming a circular body which has no terminal.

The content of the silicone component of the terminally-modified polycarbonate resin of the present invention is preferably 1 to 50% by weight, more preferably 5 to 40% by weight on average as Si element based upon the total amount of said terminally-modified polycarbonate resin.

When Si elements are contained not only at the terminal like in the case of using a polycarbonate resin having silicone structures in its main chain, it is preferable that the content of the terminal Si elements which are derived from terminal silicones is not less than 40% by weight.

(3) Acrylic Resin Composition

The acrylic resin composition of the present invention is a blend of an acrylic resin with a terminally-modified polycarbonate resin. The content of the terminally-modified polycarbonate resin is preferably 0.1 to 10% by weight. In addition, it is preferable that the content is 0.5 to 5% by weight for the purpose of improving molding roll releasability at the time of co-extrusion with other resins. In case that the content is less than 0.1% by weight, improvement of releasability and surface modification effect may be insufficient. In case that the content is more than 10% by weight, transparency and appearance may be deteriorated.

In addition, it is possible to add known additives such as ultraviolet absorbing agents, antioxidants and coloring agents to the acrylic resin composition of the present invention depending on various requirements. Furthermore, other lubricants can be additionally used in combination with the terminally-modified polycarbonate resin. Especially, when using a small amount of fatty acid amides and/or higher alcohols in combination, releasability can further be improved.

Examples of the fatty acid amides usable include ethylene-bis-stearic acid amide, methylene-bis-stearic acid amide, stearic acid amide and behenic acid amide. Examples of the higher alcohols include stearyl alcohol, lauryl alcohol, behenyl alcohol and palmityl alcohol.

In the case of using other lubricants like this, it is preferable that the content of the other lubricants is in the range from 0.05 to 1.0% by weight based upon the acrylic resin composition, and it is preferable that the content thereof is in the range from 1 to 40 parts by weight based upon 100 parts by weight of the terminally-modified polycarbonate resin.

(4) Process for Producing the Acrylic Resin Composition

Examples of the process for producing the acrylic resin composition of the present invention include a method of mixing the terminally-modified polycarbonate resin of the present invention with acrylic monomers and subsequently polymerizing the acrylic monomers to form an acrylic resin and a method of mixing the terminally-modified polycarbonate resin with an acrylic resin.

Regarding the method of mixing the terminally-modified polycarbonate resin with acrylic monomers and subsequently polymerizing the acrylic monomers, more precisely, a method of dissolving or dispersing the terminally-modified polycarbonate resin into acrylic monomers and subsequently adding a radical initiator such as benzoyl peroxide, azobisisobutyronitrile, benzophenone and 2-methyl-1-[4-(methylthio)phenyl]-2-morpholinopropane-1-one, and further adding heat or light to polymerize (or to cure) is used.

Examples of polymerization processes include suspension polymerization, emulsion polymerization, bulk polymerization and solution polymerization. In the case of using heat, it is preferable to employ the conditions wherein heating temperature is 20 to 160° C. and heating time is 0.1 to 24 hours. In the case of using light, it is preferable to employ the conditions wherein wavelength is 200 to 500 nm and irradiation time is 0.1 to 30 minutes.

The method of mixing acrylic monomers and the terminally-modified polycarbonate resin is not particularly limited. For example, a method of blending by a cylindrical rotary blender or an agitator can be employed. In addition, divinyl compounds such as N,N'-methylene-bis-acrylamide and ethyleneglycol dimethacrylate can be added to the acrylic monomers as a cross-linking agent.

When mixing the acrylic resin with the terminally-modified polycarbonate resin, the terminally-modified polycarbonate resin and other additives if necessary are added into the acrylic resin, and subsequently kneading is conducted in the publicly-known manners. Kneading is preferably conducted by using a mixer such as a fixed container type mixer, vessel-rotary mixer and a roll type mixer under the conditions at a temperature of from room temperature to 270° C. for 1 to 120 minutes.

When the layer of the acrylic resin composition is laminated on the layer of the other resins as a hardcoat, it is preferable to employ a method of mixing the terminally-modified polycarbonate resin with the acrylic monomers and subsequently polymerizing the acrylic monomer. On the other hand, when a multilayer laminated product (a multilayer sheet) is molded by forming layers of the other resins and the acrylic resin composition at a time by co-extrusion, it is preferable to employ a method of mixing the terminally-modified polycarbonate resin with the acrylic resin.

The acrylic resin composition of the present invention can be used for molding by publicly-known molding methods. It can be used for wet molding, compression molding, vacuum compression molding, extrusion molding, injection molding, inflation molding and the like. When extrusion molding or injection molding is carried out using the acrylic resin composition independently, the thickness of the molded product is preferably from 0.1 mm to 2 cm. When multilayer molding is carried out by means of co-extrusion with other resins and the like, the thickness thereof is preferably from 10 to 100 μm.

(5) Molded Product

The molded product of the present invention is a product obtained by molding the above-mentioned acrylic resin composition of the present invention. The method for obtaining the molded product is not particularly limited and wet molding, compression molding, vacuum compression molding, extrusion molding, injection molding, inflation molding and the like can be employed.

Also the forms of the molded product are not particularly limited. Molded products having various forms can be obtained depending on the intended use. Among them, film or sheet molded products are preferable according to the present invention.

In the case of a molded product formed singly of the acrylic resin composition obtained by extrusion molding or injection molding or a single-layer film or sheet molded product, the thickness of the molded product is preferably from 0.1 mm to 2 cm, though it can be determined depending on its intended use.

Examples of the molded products of the present invention additional to the above-mentioned film or sheet molded products include an injection-molded product, a compression-molded product, a vacuum compression-molded product, an inflation-molded product and a cast-molded product.

(6) Multilayer Laminated Product

The acrylic resin composition of the present invention can form a multilayer laminated product in combination with other resins. That is, the multilayer laminate product of the present invention is characterized in that it at least comprises a layer formed of the above-mentioned acrylic resin composition of the present invention.

The methods for forming a multilayer laminated product are not particularly limited. Examples of the methods include a method of multilayer molding by co-extrusion of the acrylic resin composition of the present invention with other resins, a method of molding the acrylic resin composition of the present invention into a film or a sheet and then laminating it with a film or a sheet formed of the other resins, a method of extrusion molding of the acrylic resin composition on a film or a sheet formed of the other resins and a method of coating acrylic monomers on a film or a sheet formed of the other resins and then forming the layer of the acrylic resin composition by curing by heat or light irradiation. Among them, a method using co-extrusion molding is particularly preferable.

In the case of a multilayer laminated product of the acrylic resin composition and the other resin, the thickness of the layer of the acrylic resin composition is preferably from 10 to 100 μm, more preferably from 15 to 80 μm, though it can be determined depending on its intended use. Regarding the ratio of the thickness with the layer of the other resins, it is preferable that [the layer of the acrylic resin composition]: [the layer of the other resins]=1:1 to 1:200.

In the case when multilayer laminating by co-extrusion of the acrylic resin composition of the present invention with the other resins is carried out, the number of laminated layers, combination of layers and order of layers are not particularly limited. However, it is preferable that the acrylic resin composition of the present invention at least forms the outermost layer (a skin layer) of the multilayer laminate product.

Examples of the other resins which can form a multilayer laminating product with the acrylic resin composition of the present invention include polycarbonate, polyethylene terephthalate, polybutylene terephthalate, polyethylene naphthalate, polyarylate, polystyrene, ABS, MS, AS, polyamide, polyoxymethylene, polyphenylene ether, polyvinylchloride, polyvinylidene chloride, polyethylene, polypropylene, PTFE, polysulfone, polyethersulfone, TPX, polycycloolefin and polyvinyl adamantane. Among them, the combination with polycarbonate excellent in transparency and impact resistance is suitable.

The process for producing the multilayer laminating product of the present invention will be described below, as an illustrative embodiment of a process for producing a multilayer sheet by co-extrusion, taking the case of using a polycarbonate resin as a substrate for example.

The extrusion equipment used for producing a multilayer sheet is consisting of a main-extruder whereby a polycarbonate resin forming a substrate layer is to be extruded and one or two sub-extruder(s) whereby the acrylic resin composition which will be coated on one or both sides of the substrate layer is to be extruded. In general, as a sub-extruder, the one which is smaller than the main-extruder is employed.

The temperature condition of the main-extruder is normally from 230 to 290° C., preferably from 240 to 280° C. The temperature condition of the sub-extruder is normally from 220 to 270° C., preferably from 230 to 260° C.

As a method for coating more than one of molten resins, publicly known methods such as a feed block method and a multi-manifold method can be employed. In this case, the molten resin laminated by a feed block method is introduced to a sheet molding die such as T-die to form a sheet, and subsequently it is flowed into a molding roll having a mirror-finished surface (a polishing roll) to form a bank.

The sheet molded product thus obtained is subjected to a process of mirror finishing and cooling in the course of passing through the molding roll to form a laminated body.

In the case of multi-manifold die, the melt resins laminated in said die are also molded into a sheet in the die and then mirror-finishing and cooling are carried out on the molding roll to form a laminating body. The temperature of the die is normally from 250 to 320° C., preferably from 270 to 300° C. The temperature of the molding roll is normally from 100 to 190° C., preferably from 110 to 180° C. As the roll, a vertical roll or a horizontal roll can be used accordingly.

It is also one of the preferable embodiments to place a polymer filter having an opening of 10 μm in front of the T-die of the sub-extruder in order to remove fine foreign substances in the acrylic resin composition. In addition, when cleaning level of the sub-extruder is ensured, it is also one of the preferable embodiments to place a polymer filter having an opening of 10 μm in the pelletizing process.

A hardcoat layer can be provided on the above-mentioned multilayer laminated product of the present invention. The hardcoat is provided on the outermost layer of the multilayer laminated product. Therefore, the hardcoat is preferably provided on the surface of the layer of the acrylic resin composition of the present invention.

Hardcoat-treatment provided on the layer of the acrylic resin composition is a treatment of laminating a hardcoat layer which is cured by heat or active energy ray in order to improve scratch resistance. Examples of coating materials curable by active energy ray include a resin composition comprising one or more than one resin consisting of monofunctional or polyfunctional acrylate monomers or oligomers and a photopolymerization initiator as a curing catalyst. Examples of heat-curable polymer coating materials include polyorganosiloxanes and crosslinking type acrylic resins. Some of these resin compositions are commercially available as a hardcoat agent to be used for an acrylic resin or a polycarbonate resin, and suitable ones can be selected accordingly in consideration of compatibility with a coating line.

In these coating materials, various stabilizers such as an ultraviolet absorbent, a light stabilizer and an antioxidant, a leveling agent, an antifoaming agent, a thickening agent, an antistatic agent and surfactants such as an anticlouding agent can be added in addition to organic solvents, if necessary.

Hardcoat treatment provided on the surface of the polycarbonate resin which is not co-extruded in the multilayer body is carried out in order to improve scratch resistance, and a hardcoat layer cured by active energy ray is laminated. Examples of coating materials curable by active energy ray include a resin composition comprising one or more than one resin consisting of monofunctional or polyfunctional acrylate monomers or oligomers and a photopolymerization initiator as a curing catalyst. Examples of heat-curable polymer coating materials include polyorganosiloxanes and crosslinking type acrylic resins. Some of these resin compositions are commercially available as a hardcoat agent to be used for an acrylic resin or a polycarbonate resin, and suitable ones can be selected accordingly in consideration of compatibility with a coating line.

In these coating materials, various stabilizers such as an ultraviolet absorbent, a light stabilizer and an antioxidant, a leveling agent, an antifoaming agent, a thickening agent, an antistatic agent and surfactants such as an antifogging agent can be added in addition to organic solvents, if necessary.

Examples of the coating materials to be cured by active energy line on the layer of the acrylic resin composition include a composition comprising 100 parts by weight of a photopolymerizable composition (A) which comprises 2 to 80% by weight of a bifunctional (meth)acrylate compound having the weight average molecular weight of not higher than 300 and 20 to 98% by weight of hexafunctional urethane acrylate oligomer copolymerizable therewith and 1 to 10 parts by weight of a photopolymerization initiator (B).

Examples of the bifunctional (meth)acrylate compound having the molecular weight of not higher than 300 include diethyleneglycol di(meth)acrylate, dipropyleneglycol di(meth)acrylate, tripropyleneglycol diacrylate, 1,6-hexanediol di(meth)acrylate, 2-(2'-vinyloxyethoxy)ethyl-(meth)acrylate and 1,4-butanediol diacrylate.

Examples of the hexafunctional urethane acrylate oligomers include trade name "EB-220" manufactured by DAICEL CYTEC COMPANY LTD., trade name "UN-3320HC" manufactured by Negami Chemical Industries Co., Ltd., trade name "UN-3320HA" manufactured by Negami Chemical Industries Co., Ltd., trade name "UV-7600B" manufactured by Nippon Synthetic Chemical Industry Co., Ltd., and trade name "UV-7640B" manufactured by Nippon Synthetic Chemical Industry Co., Ltd.

Regarding the photopolymerization initiators (B), commonly known compounds can be used. Examples thereof include benzoin, benzophenone, benzoin ethylether, benzoin isopropylether, 2,2-dimethoxy-2-phenylacetophenone, 1-hydroxycyclohexylphenylketone, 2-hydroxy-2-methyl-1-phenylpropane-1-one, azobisisobutyronitrile and benzoyl peroxide.

Examples of the method of curing using heat-curable polymer coatings on the layer of acrylic resin include a method of using a composition comprising the following (i), (ii) and (iii):
(i) 1 to 98 parts by weight of organotrialkoxysilane (C) represented by the formula [$R^1Si(OR^2)_3$] wherein $R^1$ represents a substituted or non-substituted monovalent hydrocarbon group, $R^2$ represents an alkyl group,
(ii) 1 to 98 parts by weight of a composition comprising 50 to 100 parts by weight of a solution of colloidal silica having a particle diameter of 4 to 20 nm which contains 10 to 50% by weight of silicic anhydride (D) and
(iii) 1.0 to 5.0 parts by weight of amine carboxylate and/or a quaternary ammonium carboxylate (E).

$R^1$ in the above-mentioned organotrialkoxysilane is preferably a substituted or non-substituted monovalent hydrocarbon group having 1 to 8 carbon atoms, examples of which include an alkyl group such as a methyl group, an ethyl group, a n-propyl group, a n-butyl group, an i-butyl group, a sec-butyl group, a n-hexyl group and a n-heptyl group, γ-chloropropyl group, a vinyl group, a 3,3,3-trifluoropropyl group, a γ-glycidoxypropyl group, a γ-methacryloxypropyl group, a γ-mercaptopropyl group, a phenyl group, and a 3,4-epoxycyclohexylethyl group.

$R^2$ in the above-mentioned organotrialkoxysilane (C) is an alkyl group having 1 to 5 carbon atoms, examples of which include a methyl group, an ethyl group, a n-propyl group, a n-butyl group, an i-butyl group, a sec-butyl group and a tert-butyl group.

Examples of the organotrialkoxysilane (C) include tetramethoxysilane, tetraethoxysilane, methyl trimethoxy silane, methyl triethoxysilane, ethyl trimethoxysilane, ethyl triethoxysilane, n-propyl trimethoxysilane, n-propyl triethoxysilane, i-propyl trimethoxysilane, i-propyl triethoxysilane, γ-chloropropyltrimethoxysilane, γ-chloropropyl triethoxysilane, vinyl trimethoxysilane, vinyl triethoxysilane, 3,3,3-trifluoropropyl trimethoxysilane, 3,3,3-trifluoropropyl triethoxysilane, γ-glycidoxypropyl trimethoxysilane, γ-glycidoxypropyl triethoxysilane, γ-methacryloxypropyl trimethoxysilane, γ-methacryloxypropyl triethoxysilane, γ-mercaptopropyl trimethoxysilane, γ-mercaptopropyl triethoxysilane, phenyl trimethoxysilane, phenyl triethoxysilane, 3,4-epoxycylohexylethyl trimethoxysilane, 3,4-epoxycylohexylethyl triethoxysilane, dimethyl dimethoxysilane, diethyl dimethoxysilane, diethyl diethoxysilane, di-n-propyl dimethoxysilane, di-n-propyl diethoxysilane, di-1-propyldimethoxysilane, di-1-propyldiethoxysilane, diphenyl dimethoxysilane and diphenyl diethoxysilane.

Among them, tetramethoxysilane, tetraethoxysilane, methyl trimethoxy silane, methyl triethoxysilane, dimethyl dimethoxysilane and dimethyl diethoxysilane are preferable.

The colloidal silica (D) composed of the above-mentioned composition contains 10 to 50% by weight of silicic anhydride and the average particle diameter of the colloidal silica is 4 to 20 nm. As a disperser of the colloidal silica (D) like this, water, an organic solvent and a mixed solvent of water with at least one of hydrophilic organic solvents such as lower aliphatic alcohol such as methanol, ethanol, isopropanol, n-butanol and isobutanol; an ethyleneglycol derivatives such as ethyleneglycol, ethyleneglycol monobutylether and ethyleneglycol monoethylether acetate; diethyleneglycol derivatives such as diethyleneglycol and diethyleneglycol monobutylether; and diacetone alcohols can be used. Among these aqueous solvents, water or a water-methanol mixed solvent is preferable in view of dispersion stability and drying characteristics of the dispersion media after coating.

Examples of commercial products wherein the colloidal silica is dispersed in a basic aqueous solution include tradename "SNOWTEX 30" and "SNOWTEX 40", each manufactured by Nissan Chemical Industries, Ltd., tradename "CATALOID S30" and "CATALOID S40" each manufactured by Catalysts and Chemicals Industries Co., Ltd.

Examples of commercial products wherein the colloidal silica is dispersed in an acidic aqueous solution include tradename "SNOWTEX O" manufactured by Nissan Chemical Industries, Ltd.

Examples of commercial products wherein the colloidal silica is dispersed in an organic solvent include tradenames "MA-ST", "IPA-ST", "NBA-ST", "IBA-ST", "EG-ST", "XBA-ST", "NPC-ST", "DMAC-ST", each manufactured by Nissan Chemical Industries, Ltd.

Examples of amine carboxylate and/or quaternary ammonium carboxylate (E) include dimethylamine acetate, ethanolamine acetate, dimethylaniline formate, tetraethylammonium benzoate, trimethylbenzylammonium acetate, tetramethylammonium acetate, tetra-n-butylammonium acetate, tetraethylammonium acetate and 2-hydroxyethyl trimethylammonium acetate.

Examples of coating materials to be cured by using active energy ray on a polycarbonate layer wherein the acrylic resin is not co-extruded include an ultraviolet curable polymer coating composition comprising 100 parts by weight of a photopolymerizable composition (F) which comprises 20 to 60% by weight of 1,9-nonanediol diacrylate (b1) and 40 to 80% by weight of the other compounds (b2) copolymerizable with said (b1) and 1 to 10 parts by weight of a photopolymerization initiator (G).

Examples of the other compounds (b2) which are copolymerizable with (b1) include multifunctional (meth)acrylate monomers which are bifunctional or higher functional, multifunctional urethane (meth)acrylate oligomers which are bifunctional or higher functional (hereinafter, "multifunctional urethane (meth)acrylate oligomer"), multifunctional polyester (meth)acrylate oligomer which are bifunctional or higher functional (hereinafter, "multifunctional polyester (meth)acrylate oligomer") and multifunctional epoxy (meth) acrylate oligomer which are bifunctional or higher functional (hereinafter, "multifunctional epoxy (meth)acrylate oligomer").

These (meth)acrylate monomers and oligomers can be used each independently or two or more of them can be used in combination with each other.

Examples of the multifunctional (meth)acrylate monomers include a monomer having more than one (meth)acryloyloxy group in a molecule.

Typical examples of bifunctional (meth)acrylate monomers include alkyleneglycol di(meth)acrylate, polyoxyalkyleneglycol di(meth)acrylate, halogenated alkyleneglycol di(meth)acrylate, fatty acid polyol-di(meth)acrylate, di(meth)acrylate with alkyleneoxide adduct of bisphenol A or bisphenol F and epoxy di(meth)acrylate with bisphenol A or bisphenol F. However, they are not limited to the above compounds and various monomers can be used.

Specific examples of bifunctional (meth)acrylate monomers include 2-n-butyl-2-ethyl-1,3-propanediol diacrylate, tripropyleneglycol diacrylate, tetraethyleneglycol diacrylate, polyethyleneglycol di(meth)acrylate, polypropyleneglycol diacrylate, triethyleneglycol dimethacrylate, 1,6-hexanediol dimethacrylate and neopentylglycol dimethacrylate.

Examples of trifunctional or higher functional (meth)acrylate monomers include trimethylolpropane trimethacrylate, trimethylolpropane ethyleneoxide adduct triacrylate, glycerin propyleneoxide adduct triacrylate and pentaerythritol tetraacrylate.

Examples of multifunctional urethane (meth)acrylate oligomers include an urethanization reaction product of (meth)acrylate monomers having at least one (meth)acryloyloxy group and hydroxy group in a molecule with polyisocyanate. Examples of multifunctional urethane (meth)acrylate oligomers include an urethanization reaction product of (meth)acrylate monomers having at least one (meth)acryloyloxy group and hydroxy group in a molecule with an isocyanate compound obtained by reacting polyols with polyisocyanate.

Examples of (meth)acrylate monomers having at least one (meth)acryloyloxy group and hydroxy group in a molecule to be used for urethanization reaction include 2-hydroxyethyl (meth)acrylate, 2-hydroxypropyl(meth)acrylate, 2-hydroxybutyl(meth)acrylate, 2-hydroxy-3-phenoxypropyl(meth) acrylate, glycerin di(meth)acrylate, trimethylolpropane di(meth)acrylate, pentaerythritol tri(meth)acrylate and dipentaerythritol penta(meth)acrylate.

Examples of polyisocyanates to be used for urethanization reaction include di- or tri-isocyanates such as hexamethylene diisocyanate, lysine diisocyanate, isophorone diisocyanate, dicyclohexylmethane diisocyanate, tolylenediisocyanate, xylylenediisocyanate, diisocyanates obtained by hydrogenating of aromatic isocyanates among them such as hydrogenated tolylenediisocyanate and hydrogenated xylylenediisocyanate, triphenylmethane triisocyanate and dimethylenetriphenyl triisocyanate and polyisocyanate obtained by polymerization of diisocyanates.

Examples of polyols to be used for urethanization reaction include, in general, aromatic polyols, aliphatic polyols and alicyclic polyols, as well as polyesterpolyol and polyetherpolyol.

Examples of the aliphatic polyols and alicyclic polyols include 1,4-butanediol, 1,6-hexanediol, neopentylglycol, ethyleneglycol, propyleneglycol, trimethylolethane, trimethylolpropane, dimethylolheptane, dimethylol propionic acid, dimethylol butyric acid, glycerin and hydrogenated bisphenol A.

Examples of polyester polyols include one obtained by dehydration condensation reaction of the above-mentioned polyols with polybasic carboxylic acid (or anhydride). Examples of the polybasic carboxylic acid include succinic acid (anhydride), adipic acid, maleic acid (anhydride), trimellitic acid (anhydride), hexahydrophthalic acid (anhydride), phthalic acid (anhydride), isophthalic acid and terephthalic acid. Examples of polyether polyols include polyalkyleneglycol as well as polyoxyalkylene-modified polyol obtained by reaction of the above-mentioned polyols or phenols with alkyleneoxide.

The multifunctional polyester (meth)acrylate oligomers can be obtained by dehydration condensation reaction of (meth)acrylic acid, polybasic carboxylic acid (anhydride) and polyols. Examples of the polybasic carboxylic acid (anhydride) to be used for the dehydration condensation reaction include succinic acid (anhydride), adipic acid, maleic acid (anhydride), itaconic acid (anhydride), trimellitic acid (anhydride), pyromellitic acid (anhydride), hexahydrophthalic acid (anhydride), phthalic acid (anhydride), isophthalic acid and terephthalic acid. Examples of the polyols to be used for the dehydration condensation reaction include 1,4-butanediol, 1,6-hexanediol, diethyleneglycol, triethyleneglycol, propyleneglycol, neopentylglycol, dimethylolheptane, dimethylol propionic acid, dimethylol butyric acid, trimethylolpropane, ditrimethylolpropane, pentaerythritol and dipentaerythritol.

The multifunctional epoxy (meth)acrylate oligomers can be obtained by addition reaction of polyglycidylether with (meth)acrylic acid. Examples of the polyglycidylether include ethyleneglycol diglycidylether, propyleneglycol diglycidylether, tripropyleneglycol diglycidylether, 1,6-hexanediol diglycidylether and bisphenol A diglycidylether.

As photopolymerization initiators to be used for the present invention, commonly known compounds can be used. Examples thereof include benzoin, benzophenone, benzoin ethylether, benzoin isopropylether, 2,2-dimethoxy-2-phenylacetophenone, 1-hydroxycyclohexylphenylketone, 2-hydroxy-2-methyl-1-phenylpropane-1-one, azobisisobutyronitrile and benzoyl peroxide. However, they are not limited to these compounds.

Examples of applicable methods of coating a coating material on a layer of the acrylic resin composition of the present invention and/or a layer of a polycarbonate resin being not co-extruded include brushing, rolling, dipping, flow coating, spray coating, a roll coater coating, a flow coater coating and a method proposed by Japanese Patent Laid Open Publication No. 2004-130540. The thickness of a hardcoat layer cured by heat or active energy ray is 1 to 20 µm, preferably 2 to 15 µm, more preferably 3 to 12 µm. When the thickness of the hardcoat layer is less than fpm, the effect of improvement of surface hardness tends to be insufficient. On the other hand, even when the thickness is more than 20 µm, the effect of improvement of surface hardness would not easily be further enhanced and it is costly disadvantageous, and in addition, it may cause a deterioration of impact resistance.

It is desirable that the hardcoat on the surface wherein the acrylic resin is not laminated with 20 to 120 µm thick, which is a hardcoat on the internal surface when used as a finished product, prevent cracks under the stress of 20 MPa.

When cracks occur under the stress of not higher than 20 MPa, cracks would occur on the internal surface when it is used as a finished product and may be hard to use.

An antireflective layer can be provided on the hardcoat. As the antireflective layer, a laminate wherein two or more layers including a higher refractive index layer and a lower refractive index layer are laminated so that the lower refractive index layer becomes the outermost surface layer is preferable.

Materials forming the higher refractive index layer are not particularly limited, and examples thereof include metal oxide such as $TiO_2$, $Y_2O_3$, $La_2O_3$, $ZrO_2$ and $Al_2O_3$.

Materials forming the lower refractive index layer are not particularly limited, and examples thereof include metal oxide and metal fluoride such as $SiO_2$, $MgF_2$, $LiF$, $3NaF \cdot AlF_3$, $AlF_3$ and $Na_3AlF_6$.

Regarding the thickness of the antireflective layer, though depending on the design of the antireflective layer, it is common to be used in the thickness range wherein the lower limit is 10 nm and the upper limit is 300 nm.

Methods of forming an antireflective layer on a hardcoat layer are not particularly limited, and examples thereof include publicly known methods such as spattering, deposition, plasma CVD and coating.

(7) Polycarbonate Resin Laminated Product

The acrylic resin composition of the present invention can form a multilayer laminated product laminated with a polycarbonate resin. In this type of laminated product (a polycarbonate resin laminated product), the acrylic resin composition of the present invention can be provided on one side or both sides of the polycarbonate resin layer.

The polycarbonate resin laminated product can preferably be produced by multilayer molding using co-extrusion of the acrylic resin composition of the present invention with a polycarbonate resin.

The film thickness of the layer of the acrylic resin composition (a skin layer) in the polycarbonate resin laminated product is preferably 10 to 100 μm, more preferably 15 to 80 μm, further preferably 20 to 70 μm. In case of not thicker than 10 μm, transparency and appearance may be deteriorated caused by turbulence of the laminated interfacial surface. In case of thicker than 100 μm, impact resistance of the polycarbonate resin layer may bee remarkably deteriorated, and in addition, it is economically disadvantageous.

The polycarbonate resin usable for a substrate of the multilayer sheet (a polycarbonate resin laminated product) of the present invention is not particularly limited as far as it is a resin obtained by the above-mentioned known methods for producing a polycarbonate resin. Examples thereof include a resin obtained by reacting carbonate-forming compounds with divalent phenols (bisphenols).

Examples of the bisphenols include 4,4'-biphenyldiol, bis(4-hydroxyphenyl)methane, bis(4-hydroxyphenyl)ether, bis(4-hydroxyphenyl)sulfone,
bis(4-hydroxy-3-methylphenyl)sulfone,
bis(4-hydroxyphenyl)sulfoxide, bis(4-hydroxyphenyl)sulfide,
bis(4-hydroxyphenyl)ketone, 1,1-bis(4-hydroxyphenyl)ethane,
2,2-bis(4-hydroxyphenyl)propane (bisphenol A; BPA),
2,2-bis(4-hydroxy-3-t-butylphenyl)propane,
2,2-bis(4-hydroxyphenyl)butane,
1,1-bis(4-hydroxyphenyl)cyclohexane,
2,2-bis(4-hydroxy-3-methylphenyl)propane,
2,2-bis(4-hydroxy-3,5-dimethylphenyl)propane,
1,1-bis(4-hydroxyphenyl)-1-phenylethane,
bis(4-hydroxyphenyl)diphenylmethane,
2,2-bis(4-hydroxy-3-allylphenyl)propane,
3,3,5-trimethyl-1,1-bis(4-hydroyphenyl)cyclohexane,
1,1-bis(4-hydroxy-2-methyl-5-t-butylphenyl)-2-methylpropane,
9,9-bis(4-hydroxy-3-ethylphenyl)fluorene,
9,9-bis(4-hydroxy-3-methylphenyl)fluorene,
9,9-bis(4-hydroxyphenyl)fluorene,
1,1-bis(4-hydroxyphenyl)cyclododecane,
1,1-bis(4-hydroxy-3-methylphenyl)cyclododecane,
2,2-bis(4-hydroxyphenyl)hexafluoropropane,
2,2-bis(4-hydroxy-3,5-dibromophenyl)propane,
α,ω-bis[3-(o-hydroxyphenyl)propyl]polydimethyldiphenyl-random copolymeric siloxane,
α,ω-bis[3-(o-hydroxyphenyl)propyl]polydimethylsiloxane,
4,4'-[1,4-phenylene-bis(1-methylethylidene)]bisphenol and
4,4'-[1,3-phenylene-bis(1-methylethylidene)]bisphenol.

Two or more of them can be used in combination with each other. Among them, it is especially preferable to use a polycarbonate resin derived from 2,2-bis(4-hydroxyphenyl) propane as a substrate.

As a molecular weight of the polycarbonate resin as a substrate of the multilayer laminated product (a polycarbonate resin laminated product) of the present invention, the viscosity average molecular weight thereof is normally 15,000 to 40,000, preferably 18,000 to 30,000. Various additives commonly used can be added to the polycarbonate resin. Examples of the additives include an ultraviolet absorbent, an antioxidant, a color protecting agent, a flame retardant and a coloring agent.

The thickness of the polycarbonate resin layer is preferably 0.04 to 2.0 mm for the usage of the present invention wherein being thinner and lighter and punching processability are required. When the thickness of the polycarbonate resin layer is less than 0.04 mm, it may be difficult to produce the polycarbonate resin laminate product by co-extrusion since the minimum required strength for molding is insufficient. When the thickness thereof is more than 2.0 mm, the necessity of the acrylic resin composition of the present invention is reduced because it is possible to provide sufficient roll releasability even by using acrylic resin compositions comprising conventional lubricants by means of optimization of molding conditions. As might be expected, it is possible to use the acrylic resin composition of the present invention at the thickness of more than 2.0 mm as well.

EXAMPLES

The present invention will be described in more detail below referring to Examples. Note that the scope of the present invention is not limited by the following examples. In the following sentences, "%" means "% by weight" if not otherwise specified.

Examples of Synthesis 1

A terminally-modified polycarbonate resin was synthesized in the same manner as described in Example 1 of Japanese Patent Laid Open Publication No. H07-258398. More precisely, 912 g of 2,2-bis(4-hydroxyphenyl)propane (hereinafter, "BPA"; manufactured by Mitsui Chemicals, Inc.) and 5 g of hydrosulfite were dissolved into 8 L of 8% (w/w %) aqueous solution of sodium hydroxide. Then, 3.6 L of methylenechloride was added to the aqueous solution and 500 g of phosgene was blown into the solution over a period of 60 minutes, while stirring and keeping the temperature of the solution at 15° C. After completion of blowing phosgene,

[Chemical Formula 13]

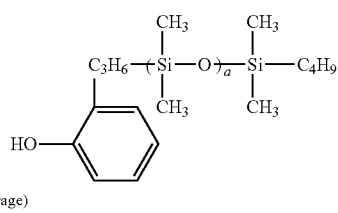

("a" is 40 on average)

608 g of polysiloxane monovalent phenol (hereinafter, "S1"; manufactured by Shin-Etsu Chemical Co., Ltd.) having the above-shown structure was added thereto and then stirred intensely to emulsify the reaction solution. After emulsification, 5 ml of triethylamine was added and the emulsion was stirred for about 1 hour for polymerization.

The polymerization reaction solution was separated into an aqueous phase and an organic phase. The organic phase was neutralized by phosphoric acid and was washed repeatedly with water until pH of the wash liquid became neutral. Subsequently, the organic phase was dropped into warm water of 60° C. to precipitate a polymer substance. After filtering, the precipitate was dried to obtain a powdery polymer product.

The intrinsic viscosity [n] of the solution of the polymer in the solvent of methylenechloride with a concentration of 0.5 g/dl at 20° C. was 0.42 [dl/g].

The polymer thus obtained was analyzed by means of infrared absorption spectrometry, and as a result, absorption due to a carbonyl group was observed at a position of 1770 cm$^{-1}$ and absorption due to an ether bond was observed at a position of 1240 cm$^{-1}$, whereby it was confirmed that the polymer had a carbonate bond. In addition, absorption due to a hydroxy group was scarcely observed at a position of 3650 to 3200 cm$^{-1}$. Furthermore, a peak due to a siloxane group was observed at a position of 1100 to 1020 cm$^{-1}$. By means of fluorescent X-ray analysis using a Cr tube bulb, it was confirmed that the polymer comprises silicon (Si) elements. Consequently, the polymer was determined to be a polycarbonate polymer having the following structure. In addition, on the analysis, the ratio of the terminal Si elements in the polymer was 13.4% by weight based upon the total amount of the polymer.

[Chemical Formula 14]

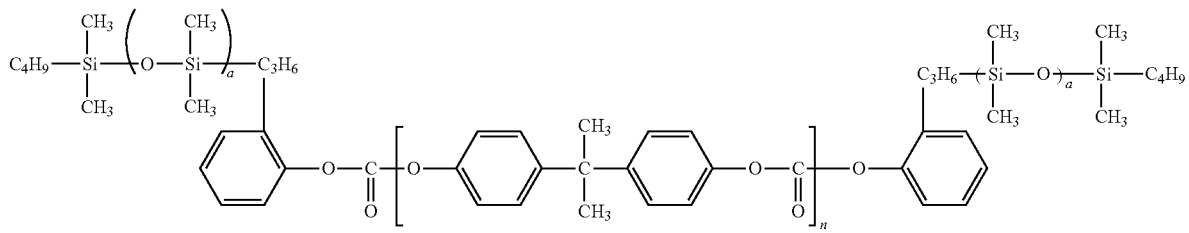

("n" is 44 on average)

Examples of Synthesis 2

Synthesis was carried out in the same manner as Example of Synthesis 1 except for using 608 g of polysiloxane monovalent phenol having the following structure:

[Chemical Formula 15]

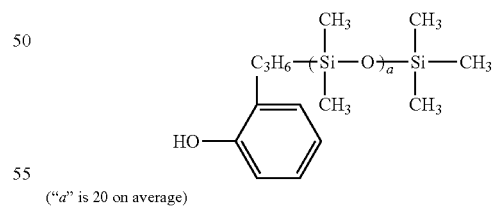

("a" is 20 on average)

(hereinafter, "S2"; manufactured by Shin-Etsu Chemical Co., Ltd.) in place of the polysiloxane monovalent phenol in Example of Synthesis 1. The intrinsic viscosity [η] of the polymer thus obtained was 0.22 [dl/g]. According to infrared absorption spectrometry analysis and fluorescent X-ray analysis, the polymer was determined to be a polycarbonate polymer having the following structure. In addition, the ratio of the terminal Si elements in the polymer was 13.0% by weight based upon the total amount of the polymer.

[Chemical Formula 16]

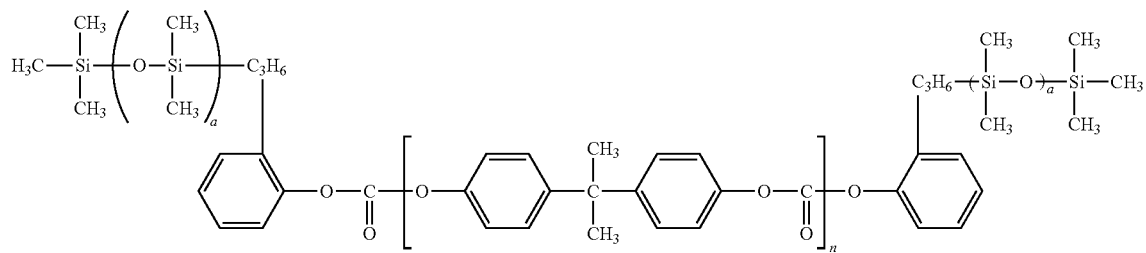

("n" is 22 on average)

Examples of Synthesis 3

Synthesis was carried out in the same manner as Example of Synthesis 2 except for using 912 g of BPA and 152 g of α,ω-bis[3-(o-hydroxyphenyl)propyl]polydimethylsiloxane having the following structure:

[Chemical Formula 17]

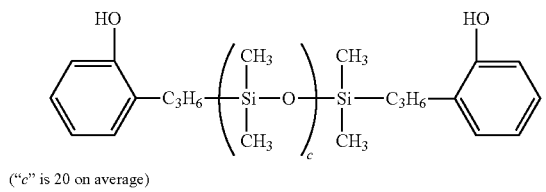

("c" is 20 on average)

(manufactured by Shin-Etsu Chemical Co., Ltd.) in place of 912 g of BPA and changing the amount of S2 to 456 g. The intrinsic viscosity [η] of the polymer thus obtained was 0.33 [dl/g]. According to infrared absorption spectrometry analysis and fluorescent X-ray analysis, the polymer was determined to be a polycarbonate polymer having the following structure. In addition, the ratio of the Si elements in the polymer was 12.9% by weight based upon the total amount of the polymer.

[Chemical Formula 18]

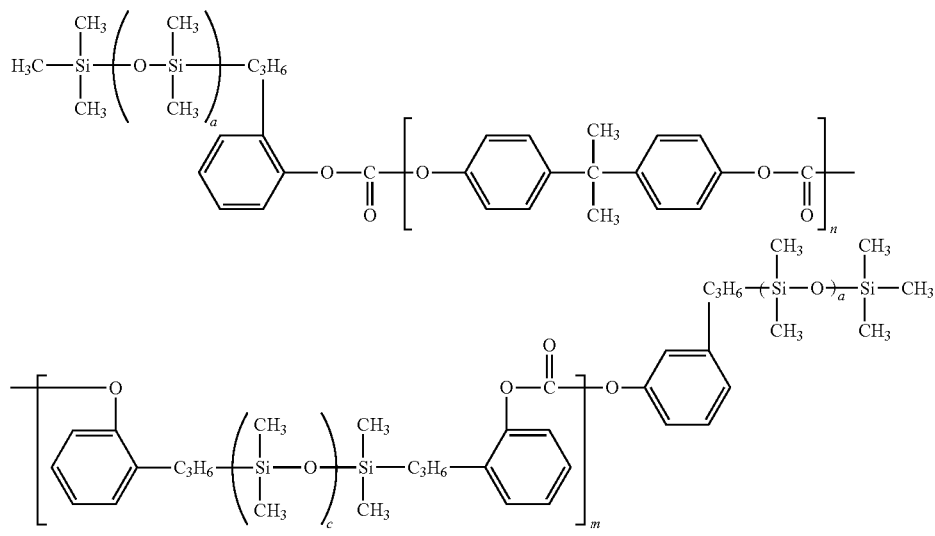

n:m = approximately 48:1 (molar ratio)
n + m = 30 on average

Examples of Synthesis 4

Synthesis was carried out in the same manner as Example of Synthesis 3 except for changing the amount of S2 to 304 g and adding 152 g of dimethyl silicone oil having the following structure:

[Chemical Formula 19]

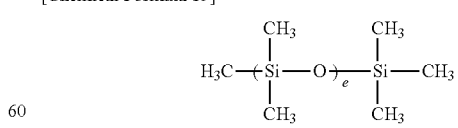

("e" is 40 on average)

(manufactured by Shin-Etsu Chemical Co., Ltd.) concurrently with S2. The intrinsic viscosity [η] of the polymer mixture thus obtained was 0.33 [dl/g]. According to infrared absorption spectrometry analysis and fluorescent X-ray analysis, the polymer was determined to be a polycarbonate polymer mixture having the similar structure as the one in Example of Synthesis 3. In addition, the ratio of the Si elements in the polymer was 13.1% by weight based upon the total amount of the polymer.

Examples of Synthesis 5

Synthesis was carried out in the same manner as Example of Synthesis 1 except for using 1,1-bis(4-hydroxyphenyl) cyclohexane, manufactured by Honshu Chemical Industry Co., Ltd., in place of BPA. The intrinsic viscosity [η] of the polymer thus obtained was 0.40 [dl/g]. According to infrared absorption spectrometry analysis and fluorescent X-ray analysis, the polymer was determined to be a polycarbonate polymer having the following structure. In addition, the ratio of the terminal Si elements in the polymer was 13.5% by weight based upon the total amount of the polymer.

[Chemical Formula 20]

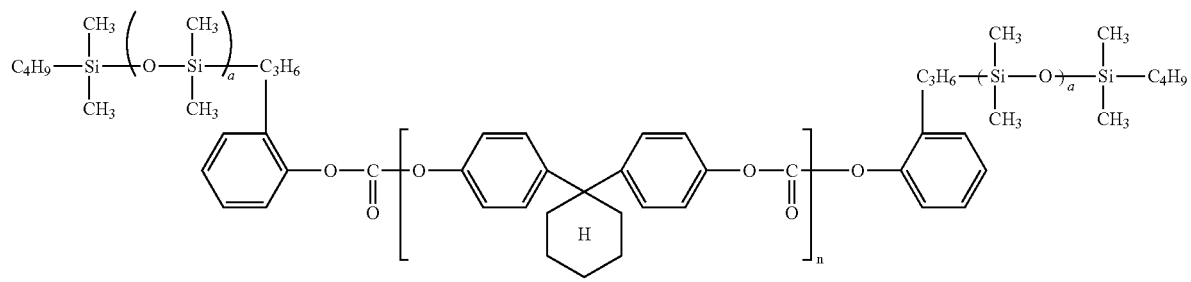

("n" is 36 on average)

Examples of Synthesis 6

Synthesis was carried out in the same manner as Example of Synthesis 1 except for using 2,2-bis(4-hydroxy-3-methylphenyl)propane, manufactured by API Corporation, in place of BPA. The intrinsic viscosity [η] of the polymer thus obtained was 0.43 [dl/g]. According to infrared absorption spectrometry analysis and fluorescent X-ray analysis, the polymer was determined to be a polycarbonate polymer having the following structure. In addition, the ratio of the terminal Si elements in the polymer was 13.5% by weight based upon the total amount of the polymer.

[Chemical Formula 21]

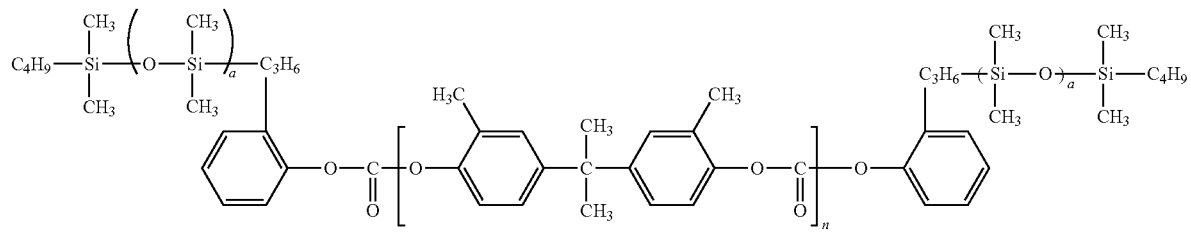

("n" is 38 on average)

Examples of Synthesis 7

Synthesis was carried out in the same manner as Example of Synthesis 1 except for using 775 g of BPA and 137 g of 4,4'-biphenyldiol, manufactured by Honshu Chemical Industry Co., Ltd., in place of 912 g of BPA. The intrinsic viscosity [η] of the polymer thus obtained was 0.42 [dl/g]. According to infrared absorption spectrometry analysis and fluorescent X-ray analysis, the polymer was determined to be a polycarbonate polymer having the following structure. In addition, the ratio of the terminal Si elements in the polymer was 13.3% by weight based upon the total amount of the polymer.

[Chemical Formula 22]

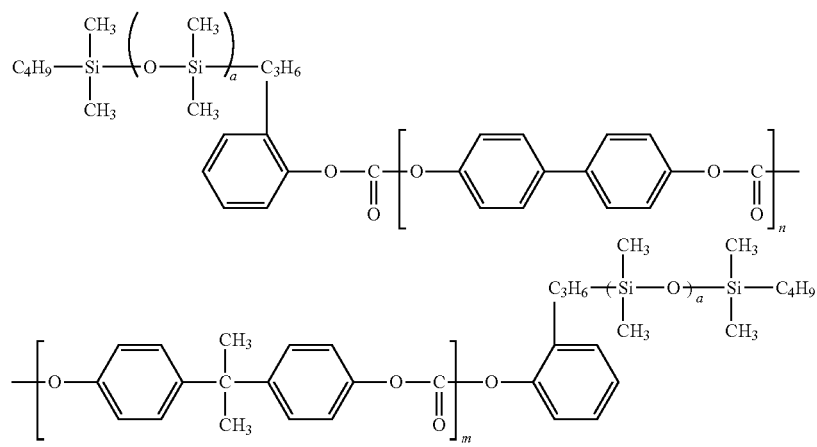

n:m = approximately 5:1 (molar ratio)
n + m = 44 on average

Examples of Synthesis 8

Synthesis was carried out in the same manner as Example of Synthesis 1 except for using 638 g of BPA and 274 g of bis(4-hydroxyphenyl)methane, manufactured by SANKO CO., LTD., in place of 912 g of BPA. The intrinsic viscosity [η] of the polymer thus obtained was 0.42 [dl/g]. According to infrared absorption spectrometry analysis and fluorescent X-ray analysis, the polymer was determined to be a polycarbonate polymer having the following structure. In addition, the ratio of the terminal Si elements in the polymer was 13.3% by weight based upon the total amount of the polymer.

[Chemical Formula 23]

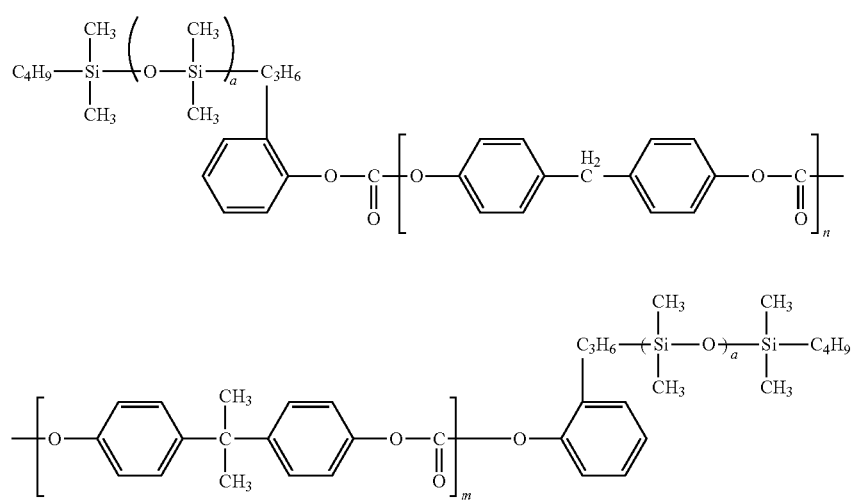

n:m = approximately 2:1
n + m = 44 on average

Examples of Synthesis 9

Synthesis was carried out in the same manner as Example of Synthesis 1 except for using 608 g of polysiloxane-containing monovalent phenol having the following structure:

[Chemical Formula 24]

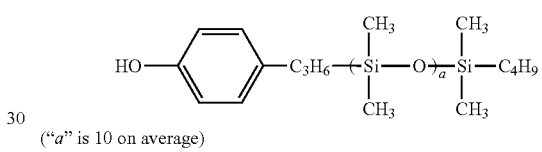

("a" is 10 on average)

(hereinafter, "S3"; manufactured by Shin-Etsu Chemical Co., Ltd.) in place of the polysiloxane monovalent phenol in Example of Synthesis 1. The intrinsic viscosity [η] of the polymer thus obtained was 0.17 [dl/g]. According to infrared absorption spectrometry analysis and fluorescent X-ray analysis, the polymer was determined to be a polycarbonate polymer having the following structure. In addition, the ratio of the terminal Si elements in the polymer was 11.6% by weight based upon the total amount of the polymer.

[Chemical Formula 25]

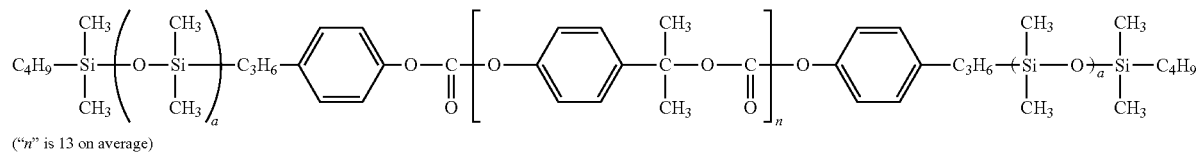

("n" is 13 on average)

Examples of Synthesis 10

Synthesis was carried out in the same manner as Example of Synthesis 3 except for using 608 g of α,ω-bis[3-(o-hydroxyphenyl)propyl]polydimethylsiloxane and using 28 g of p-t-butylphenol, manufactured by DIC Co., Ltd., in place of S1. The intrinsic viscosity [η] of the polymer thus obtained was 0.43 [dl/g]. According to infrared absorption spectrometry analysis and fluorescent X-ray analysis, the polymer was determined to be a polycarbonate polymer having the following structure. In addition, the ratio of the Si elements in the polymer was 11.9% by weight based upon the total amount of the polymer.

[Chemical Formula 26]

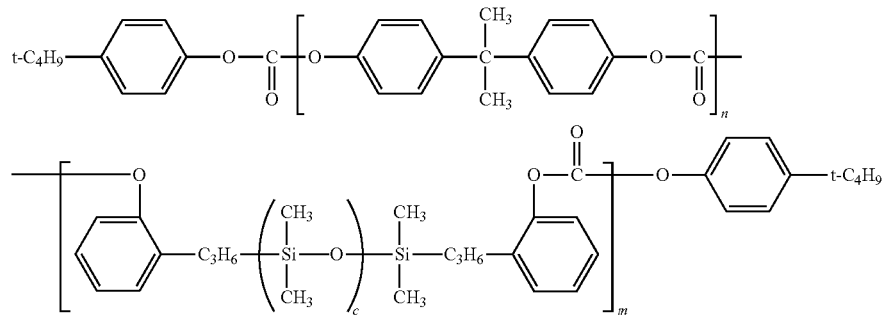

n:m = approximately 12:1
n + m = 46 on average

Evaluating methods and test methods carried out in the Examples using the terminally-modified polycarbonate resins obtained by the above Examples of synthesis were shown below:
1) Evaluation of Roll Staining:
Degree of accumulation of lubricants on the first roll was evaluated by eye observation.
○: Deterioration of a sheet appearance by roll staining in the process of producing a multilayer sheet for 8 hours did not occur.
Δ: Deterioration of a sheet appearance by roll staining in the process of producing a multilayer sheet for 1 hour did not occur, and deterioration of a sheet appearance by roll staining in the process of producing a multilayer sheet for 8 hours occurred.
X: Deterioration of a sheet appearance by roll staining in the process of producing a multilayer sheet for 1 hour occurred.
2) High-Temperature and High-Humidity Test
The sheets obtained by Examples and Comparative Examples were maintained under the conditions of 80° C. and 85% RH for 200 hours, and then the degree of whitening of the acrylic resin composition layers thereof were determined by visual observation from the thickness direction.

○: Whitening was not observed.
Δ: Whitening was slightly observed.
X: Whitening was clearly confirmed.
3) Evaluation of Releasability
After a continuous molding for 8 hours, stability of release position on the third polishing roll was evaluated.
○: Highly stable and there was not varied in the release position even after a continuous molding for 8 hours.
Δ: After a continuous molding for 8 hours, the release position was lowered to be unstable, and therefore deterioration of appearance (or a release mark) caused by variance of release position emerged.
X: The release position was lowered in the process of a continuous molding for 8 hours and the sheet was wound around the third polishing roll to stop.
4) Evaluation of Surface Slidability
After wiping the surface of the acrylic resin composition layer of the multilayer sheet lightly with a cotton bud containing methanol, the coefficient of static friction thereof was measured and evaluated by a measuring device, tradename; "Muse 94±11", manufactured by Shinto Scientific Co., Ltd.,
5) Evaluation of Water Repellency:
After wiping the surface of the acrylic resin composition layer of the multilayer sheet lightly with a cotton bud containing methanol, the sheet was dried in air, and then a contact angle was measured by purified water and evaluated.
Lubricants, polycarbonate resins and acrylic resins used in Examples and Comparative Examples were shown below.
1) Lubricants
SPC1: Terminally silicone-modified polycarbonate resin obtained by Example of synthesis 1
SPC2: Terminally silicone-modified polycarbonate resin obtained by Example of synthesis 2
SPC3: Terminally silicone-modified polycarbonate resin obtained by Example of synthesis 3

SPC4: Terminally silicone-modified polycarbonate resin obtained by Example of synthesis 4
SPC5: Terminally silicone-modified polycarbonate resin obtained by Example of synthesis 5
SPC6: Terminally silicone-modified polycarbonate resin obtained by Example of synthesis 6
SPC7: Terminally silicone-modified polycarbonate resin obtained by Example of synthesis 7
SPC8: Terminally silicone-modified polycarbonate resin obtained by Example of synthesis 8
SPC9: Terminally silicone-modified polycarbonate resin obtained by Example of synthesis 9
SPC10: Main chain silicone-modified polycarbonate resin obtained by Example of synthesis 10
Lubricant A: Ethylene bis stearic acid amide, tradename "LIGHT-AMIDE WEF", manufactured by KYOEISHA CHEMICALS Co, LTD.
Lubricant B: Stearic acid monoglyceride, manufactured by Kishida Chemical Co., Ltd.
Lubricant C: Silicone oil, tradename "KF-96-30cs", manufactured by Shin-Etsu Chemical Co., Ltd.
Lubricant D: Stearyl alcohol, manufactured by Wako Pure Chemical Industries, Ltd.
2) Polycarbonate Resin A polycarbonate resin derived from bisphenol A as bisphenols, tradename; "Iupilon E-2000", manufactured by Mitsubishi Gas Chemical Company, Inc., wherein "Iupilon" is a registered trademark, having a viscosity average molecular weight of 27,000 was used.

3) Acrylic Resin:

Polymethylmethacrylate, tradename "Altuglas V020", manufactured by ARKEMA, having a weight average molecular weight of 100,000, was used as an acrylic resin. The acrylic resin was blended with lubricants before extrusion.

Examples 1 to 11 and Comparative Examples 1 to 7

The extruder for the polycarbonate resin layer was set up as follows: barrel diameter=65 mm, screw L/D=35, cylinder temperature=270° C.

The extruder for the acrylic resin composition layer to form coating layers on the both sides of the polycarbonate resin layer was set up as follows: barrel diameter=32 mm, screw L/D=32, cylinder temperature=250° C.

The two resins are melt-extruded at the same time and a feed block was used to laminate to form a coating layer formed of the acrylic resin composition on both sides of the polycarbonate resin layer.

The inside temperature of the die head was set to 260° C. The resins laminated and combined with each other in the die were introduced to three mirror-finished polishing rolls placed horizontally. Of the three polishing rolls, the temperature of the first roll was set to 110° C., the temperature of the second roll was set to 140° C. and the temperature of the third roll was set to 180° C. The bank was formed at the interval of the roll which the resins were firstly flowed in, and then the resins were passed through the second and third rolls. The withdrawing rate of the first roll and the second roll was 2.5 m/min, the withdrawing rate of the third roll was 2.6 m/min and the speed of the pinch roll for withdrawing was 2.7 m/min.

The multilayer sheets thus obtained had the thickness of 0.5 mm. The thicknesses of both of the coating layers formed of the acrylic resin composition were respectively 20 μm. The results of the evaluations for the multilayer sheets were shown in Table 1.

The contents of the lubricants comprised in the acrylic resin composition of Examples 1 to 11 and Comparative Examples 1 to 7 were shown in Table 1.

According to Table 1, it is apparent that the acrylic resin composition/polycarbonate resin multilayer sheet of the present invention is excellent in releasability, high-temperature high-humidity resistance and surface slidability.

Examples 12 and 13, Comparative Examples 8 and 9

99 parts by weight of methyl methacrylate manufactured by Mitsubishi Gas Chemical Company, Inc., 0.5 parts by weight of pentaerythritol tetraacrylate manufactured by DAICEL-CYTEC COMPANY, LTD. and 0.5 parts by weight of 2-methyl-1-[4-(methylthio)phenyl]-2-morphorinopropane-1-one, tradename "IRGACURE 907", manufactured by Ciba Specialty Chemicals Inc., were mixed with each other to obtain a mixed solution, and then the lubricant of the present invention was added thereto. Then, the mixed solution was coated on the surface of a polycarbonate resin sheet having the thickness of 0.5 mm with 30 cm wide and 30 cm long, manufactured by Mitsubishi Gas Chemical Company, Inc., by a bar coater to form a coating layer having the thickness of about 20 μm with 20 cm wide and 20 cm long. After coating, the coated surface was subjected to an UV irradiation for 30 seconds by a metal halide lamp, trade name "MAL-250NL", manufactured by Nippondenchi, having irradiation energy of 80 W/cm to carry out curing.

The contents of the lubricants mixed with the methylmethacrylate mixed solution in Examples 12 and 13 and Comparative Examples 8 and 9 were shown in Table 2. According to Table 2, it is apparent that the acrylic resin composition/polycarbonate resin multilayer sheet of the present invention is excellent in surface slidability and water repellency.

TABLE 1

| Example | Lubricant | The content of lubricant (wt %)*1 | Roll Staining | Re-leasability | High-temperature High-humidity Resistance | Coefficient of Static Friction (μ) | Contact Angle (°) |
|---|---|---|---|---|---|---|---|
| 1 | SPC1 | 1.0 | ○ | ○ | ○ | 0.20 | 89 |
| 2 | SPC2 | 0.5 | ○ | ○ | ○ | 0.22 | 92 |
| 3 | SPC3 | 1.0 | ○ | ○ | ○ | 0.21 | 95 |
| 4 | SPC4 | 0.5 | ○ | ○ | ○ | 0.23 | 89 |
| 5 | SPC5 | 1.0 | ○ | ○ | ○ | 0.19 | 94 |
| 6 | SPC6 | 1.0 | ○ | ○ | ○ | 0.21 | 92 |
| 7 | SPC7 | 1.0 | ○ | ○ | ○ | 0.20 | 95 |
| 8 | SPC8 | 1.0 | ○ | ○ | ○ | 0.21 | 93 |
| 9 | SPC9 | 3.0 | ○ | ○ | ○ | 0.15 | 96 |

TABLE 1-continued

| Example | Lubricant | The content of lubricant (wt %)*1 | Roll Staining | Re-leasability | High-temperature High-humidity Resistance | Coefficient of Static Friction (μ) | Contact Angle (°) |
|---|---|---|---|---|---|---|---|
| 10 | SPC1 + A | 0.8 + 0.2 (A) | ○ | ○ | ○ | 0.20 | 91 |
| 11 | SPC1 + D | 0.6 + 0.4 (D) | ○ | ○ | ○ | 0.23 | 90 |
| Comparative Example | | | | | | | |
| 1 | — | — | *2 | X | ○ | 0.45 | 70 |
| 2 | A | 1.0 | X | ○ | X | 0.41 | 79 |
| 3 | B | 1.0 | X | ○ | Δ | 0.42 | 78 |
| 4 | C | 1.0 | X | Δ | Δ | 0.38 | 82 |
| 5 | D | 1.0 | X | X | Δ | 0.43 | 71 |
| 6 | SPC10 | 1.0 | ○ | X | ○ | 0.34 | 84 |
| 7 | SPC10 | 3.0 | ○ | ○ | *3 | 0.25 | 88 |

*1: The content based upon the acrylic resin
*2: Since roll winding occurred often, the extrusion process ceased in 30 minutes.
*3: Whitening was slightly observed before tests.

TABLE 2

| | Lubricant | The content of lubricant (wt %) *4 | Coefficient of Static Friction (μ) | Contact Angle (°) |
|---|---|---|---|---|
| Example | | | | |
| 12 | SPC5 | 1.0 | 0.18 | 96 |
| 13 | SPC6 | 1.0 | 0.20 | 94 |
| Comparative Example | | | | |
| 8 | — | — | 0.46 | 69 |
| 9 | A | 1.0 | 0.42 | 80 |

*4: The content based upon the methyl methacrylate mixed solution

INDUSTRIAL APPLICABILITY

The molded product formed of the acrylic resin composition of the present invention is hardly whitened and can maintain excellent slidability even under the conditions of high temperature and high humidity. Especially, in the case when the acrylic resin composition is laminated with a polycarbonate resin by co-extrusion molding, a multilayer laminate having excellent productivity and environmental stability which is hardly whitened and can maintain excellent appearance and slidability even under the conditions of high temperature and high humidity can be obtained, since roll releasability of the acrylic resin composition layer is improved and roll fouling is significantly reduced.

Therefore, the multilayer laminate thus obtained is suitable for usages wherein high scratch resistance and high impact resistance are required such as various materials for windowpanes, optical materials and protection sheets for a LCD and an EL display.

What is claimed is:

1. A multilayer laminated product comprising a layer formed of an acrylic resin composition and a layer formed of a polycarbonate resin,
wherein the layer formed of an acrylic resin composition comprises
an acrylic resin as a main component, and
a terminally-modified polycarbonate resin having terminal groups represented by the following formula (1):

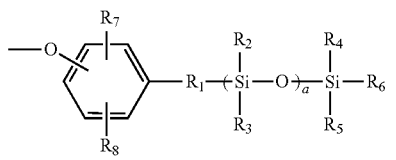

wherein, in formula (1),
$R_1$ represents an alkylene group having 1 to 20 carbon atoms,
$R_2$ to $R_6$ represent hydrogen, an alkyl group having 1 to 10 carbon atoms, an aryl group having 6 to 12 carbon atoms or an alkenyl group having 2 to 10 carbon atoms,
$R_7$ and $R_8$ represent hydrogen, fluorine, chlorine, bromine, iodine, an alkyl group having 1 to 10 carbon atoms, an aryl group having 6 to 12 carbon atoms, an alkenyl group having 2 to 10 carbon atoms, an alkoxy group having 1 to 5 carbon atoms or an aralkyl group having 7 to 17 carbon atoms, and
"a" is an integer from 1 to 1000, and
wherein the layer formed of the acrylic resin composition is laminated on one side or both sides of the layer formed of the polycarbonate resin.

2. The multilayer laminated product according to claim 1, further comprising a hardcoat layer.

3. The multilayer laminated product according to claim 1, wherein the content of the terminally-modified polycarbonate resin in the acrylic resin composition is 0.1 to 10% by weight.

4. The multilayer laminated product according to claim 1, wherein the terminally-modified polycarbonate resin has an intrinsic viscosity of 0.05 to 1.5 dl/g.

5. The multilayer laminated product according to claim 1, wherein $R_2$ to $R_6$ in formula (1) is hydrogen, a methyl group, a butyl group or a phenyl group.

6. The multilayer laminated product according to claim 1, wherein $R_1$ in formula (1) is an alkylene group having 1 to 6 carbon atoms.

7. The multilayer laminated product according to claim 1, wherein "a" in formula (1) is from 4 to 100.

8. The multilayer laminated product according to claim 1, wherein the terminally-modified polycarbonate resin has repeating units represented by the following formula (2):

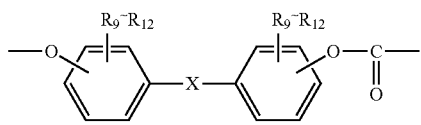

(2)

wherein, in formula (2), $R_9$ to $R_{12}$ represent hydrogen, fluorine, chlorine, bromine, iodine, an alkyl group having 1 to 9 carbon atoms, an aryl group having 6 to 12 carbon atoms, an alkenyl group having 2 to 5 carbon atoms, an alkoxy group having 1 to 5 carbon atoms or an aralkyl group having 7 to 17 carbon atoms, and "X" represents a group selected from the group consisting of divalent organic groups represented by the following formulas:

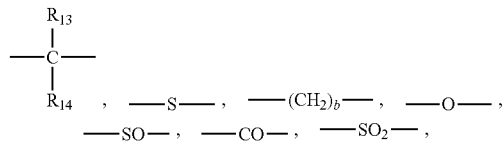

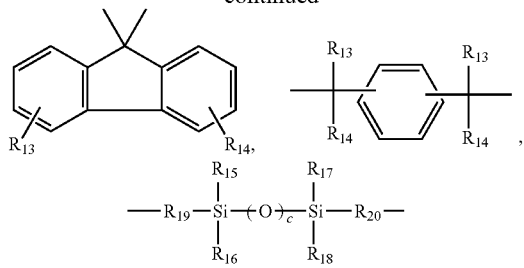

wherein, in the above formulas, $R_{13}$ and $R_{14}$ represent hydrogen, fluorine, chlorine, bromine, iodine, an alkyl group having 1 to 9 carbon atoms, an alkoxy group having 1 to 5 carbon atoms or an aryl group having 6 to 12 carbon atoms, or a group forming a carbon ring or a heterocycle wherein $R_{13}$ and $R_{14}$ are bonded with each other, $R_{15}$ to $R_{18}$ represent hydrogen, an alkyl group having 1 to 10 carbon atoms, an aryl group having 6 to 12 carbon atoms or an alkenyl group having 2 to 10 carbon atoms, $R_{19}$ and $R_{20}$ represent an alkylene group having 1 to 20 carbon atoms, "b" is an integer from 0 to 20, and "c" is an integer from 1 to 1000.

* * * * *